United States Patent
Patton et al.

(10) Patent No.: US 9,246,586 B2
(45) Date of Patent: Jan. 26, 2016

(54) METHOD AND SYSTEM FOR ENABLING AND CONTROLLING COMMUNICATION TOPOLOGY, ACCESS TO RESOURCES, AND DOCUMENT FLOW IN A DISTRIBUTED NETWORKING ENVIRONMENT

(75) Inventors: Charles Patton, Eugene, OR (US); Jeremy Roschelle, Palo Alto, CA (US); Roy D. Pea, Menlo Park, CA (US); Phil Vahey, San Francisco, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 239 days.

(21) Appl. No.: 13/402,187

(22) Filed: Feb. 22, 2012

(65) Prior Publication Data

US 2012/0272295 A1  Oct. 25, 2012

Related U.S. Application Data

(60) Continuation of application No. 12/249,729, filed on Oct. 10, 2008, now Pat. No. 8,127,039, which is a division of application No. 10/012,708, filed on Nov. 16, 2001, now abandoned.

(60) Provisional application No. 60/291,200, filed on May 15, 2001.

(51) Int. Cl.
| | |
|---|---|
| *G06F 15/16* | (2006.01) |
| *H04B 10/114* | (2013.01) |
| *H04L 29/06* | (2006.01) |
| *H04W 8/26* | (2009.01) |
| *H04W 28/10* | (2009.01) |
| *H04W 74/00* | (2009.01) |
| *H04W 80/00* | (2009.01) |

(52) U.S. Cl.
CPC ........ *H04B 10/1149* (2013.01); *H04L 63/0442* (2013.01); *H04L 63/061* (2013.01); *H04W 8/26* (2013.01); *H04W 28/10* (2013.01); *H04W 74/00* (2013.01); *H04W 80/00* (2013.01)

(58) Field of Classification Search
CPC ......... H04W 8/205; G09B 5/14; H04L 63/04; H04L 63/061; H04L 63/08; H04L 63/12; H04L 47/10; H04L 63/0042
USPC .................................................. 709/232, 237
See application file for complete search history.

(56) References Cited

U.S. PATENT DOCUMENTS

| | | |
|---|---|---|
| 5,124,984 A | 6/1992 | Engel |
| 5,481,735 A | 1/1996 | Mortensen et al. |
| 5,546,584 A | 8/1996 | Lundin et al. |
| 5,790,553 A | 8/1998 | Deaton et al. |
| 5,864,683 A | 1/1999 | Boebert et al. |

(Continued)

*Primary Examiner* — Kristie Shingles
(74) *Attorney, Agent, or Firm* — Marger Johnson

(57) ABSTRACT

Described are a system and method for use by a computing device to transmit information over a communication medium. The computing device communicates over the medium according to a protocol stack having a plurality of protocol layers. Information having an identifier is received at a first protocol layer from a higher protocol layer in the protocol stack. The computing device determines whether to present the information to the network communication medium based on at least one term of a contract associated with the identifier. Upon determining to present the information to the communication medium, the computing device incorporates the identifier in the information before placing the information on the network communication medium.

27 Claims, 20 Drawing Sheets

(56) References Cited

U.S. PATENT DOCUMENTS

| | | |
|---|---|---|
| 5,935,245 A | 8/1999 | Sherer |
| 5,941,947 A | 8/1999 | Brown et al. |
| 5,950,195 A | 9/1999 | Stockwell et al. |
| 5,968,176 A | 10/1999 | Nessett et al. |
| 6,047,051 A | 4/2000 | Ginzboorg et al. |
| 6,052,787 A | 4/2000 | Euchner et al. |
| 6,105,027 A | 8/2000 | Schneider et al. |
| 6,118,744 A | 9/2000 | Sturgeon et al. |
| 6,148,290 A | 11/2000 | Dan et al. |
| 6,154,775 A | 11/2000 | Coss et al. |
| 6,219,786 B1 | 4/2001 | Cunningham et al. |
| 6,233,686 B1 | 5/2001 | Zenchelsky et al. |
| 6,282,183 B1 | 8/2001 | Harris et al. |
| 6,304,973 B1 | 10/2001 | Williams |
| 6,345,288 B1 * | 2/2002 | Reed et al. .................. 709/201 |
| 6,347,376 B1 | 2/2002 | Attwood et al. |
| 6,466,780 B1 | 10/2002 | Geiselman et al. |
| 6,480,957 B1 | 11/2002 | Liao et al. |
| 6,484,261 B1 | 11/2002 | Wiegel |
| 6,487,600 B1 | 11/2002 | Lynch |
| 6,496,851 B1 | 12/2002 | Morris et al. |
| 6,510,349 B1 | 1/2003 | Schneck et al. |
| 6,535,592 B1 | 3/2003 | Snelgrove |
| 6,539,482 B1 | 3/2003 | Blanco et al. |
| 6,539,483 B1 | 3/2003 | Harrison et al. |
| 6,549,949 B1 | 4/2003 | Bowman-Amuah |
| 6,580,906 B2 | 6/2003 | Bilgic et al. |
| 6,609,196 B1 | 8/2003 | Dickinson et al. |
| 6,618,806 B1 | 9/2003 | Brown et al. |
| 6,622,014 B1 | 9/2003 | Daniel |
| 6,668,045 B1 | 12/2003 | Mow |
| 6,671,732 B1 | 12/2003 | Weiner |
| 6,684,240 B1 | 1/2004 | Goddard |
| 6,732,278 B2 | 5/2004 | Baird et al. |
| 6,760,748 B1 * | 7/2004 | Hakim .................. 709/204 |
| 6,801,909 B2 | 10/2004 | Delgado et al. |
| 6,812,938 B2 | 11/2004 | Pinnell |
| 6,826,609 B1 | 11/2004 | Smith et al. |
| 6,886,044 B1 | 4/2005 | Miles et al. |
| 6,915,437 B2 | 7/2005 | Swander et al. |
| 6,988,133 B1 * | 1/2006 | Zavalkovsky et al. ......... 709/223 |
| 7,027,773 B1 * | 4/2006 | McMillin ..................... 455/41.2 |
| 7,136,645 B2 * | 11/2006 | Hanson et al. ............. 455/435.1 |
| 7,181,017 B1 * | 2/2007 | Nagel et al. .................... 380/282 |
| 7,200,749 B2 | 4/2007 | Wheeler et al. |
| 7,251,695 B2 | 7/2007 | Khodko et al. |
| 7,340,439 B2 * | 3/2008 | Burger et al. .................... 705/65 |
| 7,346,677 B1 * | 3/2008 | Mohaban ................ H04L 12/66 709/223 |
| 7,463,726 B2 * | 12/2008 | Jensen et al. ............. 379/114.02 |
| 7,827,057 B1 * | 11/2010 | Walker ................ G06Q 10/101 705/14.1 |
| 7,852,830 B2 * | 12/2010 | Kikinis ......................... 370/352 |
| 7,884,737 B2 * | 2/2011 | Zigdon et al. ............ 340/870.02 |
| 8,127,039 B2 | 2/2012 | Patton |
| 2001/0005890 A1 | 6/2001 | Nitaki |
| 2002/0016840 A1 | 2/2002 | Herzog et al. |
| 2002/0069278 A1 | 6/2002 | Forslow |
| 2003/0008662 A1 * | 1/2003 | Stern ................ H04M 1/72572 455/456.1 |
| 2012/0023217 A1 * | 1/2012 | Wakumoto ............. H04L 47/10 709/223 |

* cited by examiner

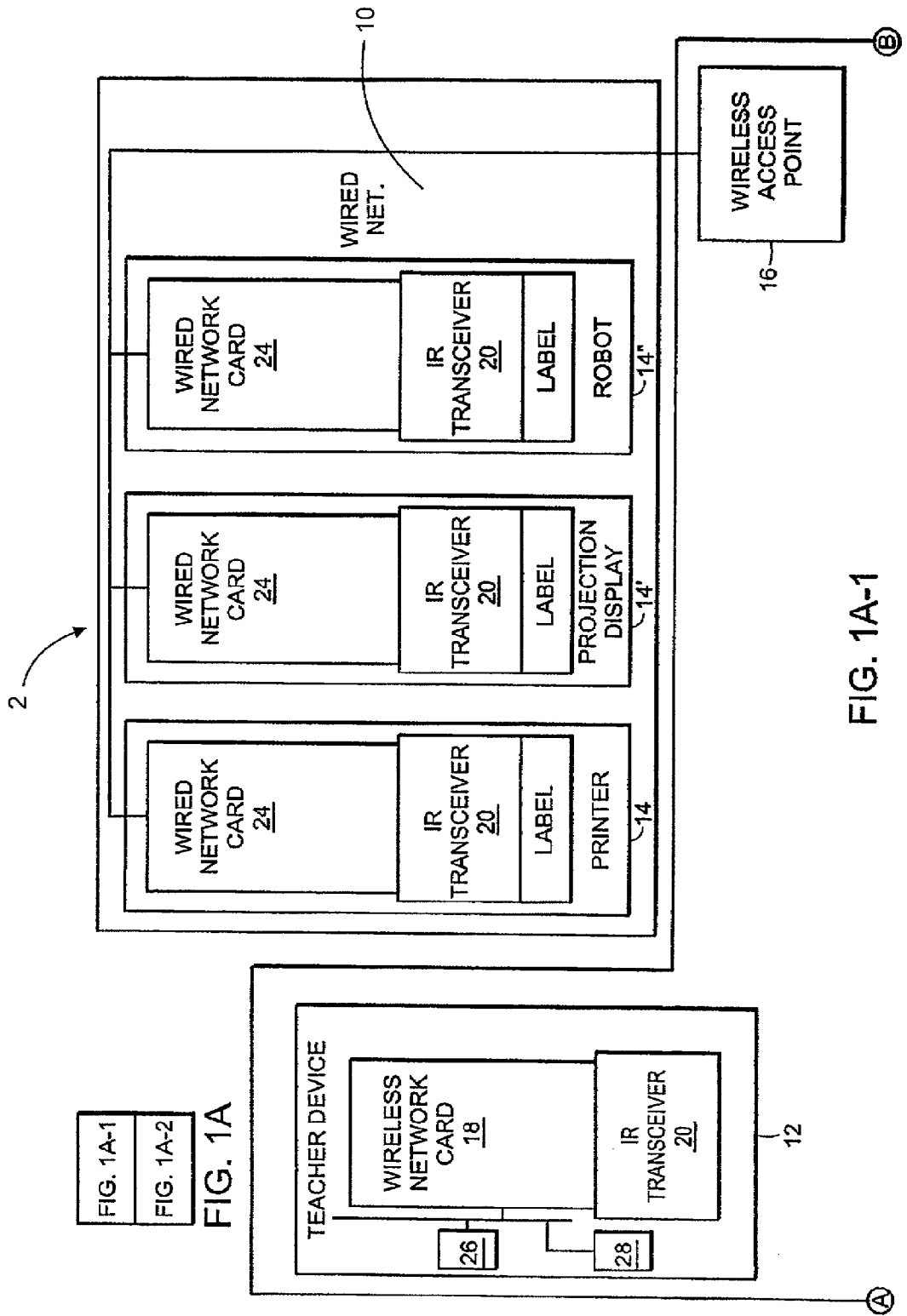

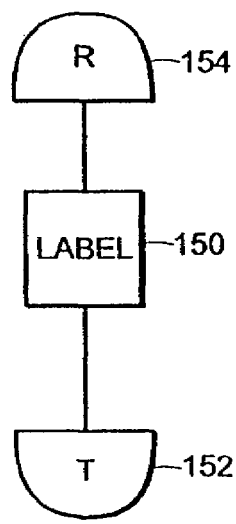
FIG. 3A
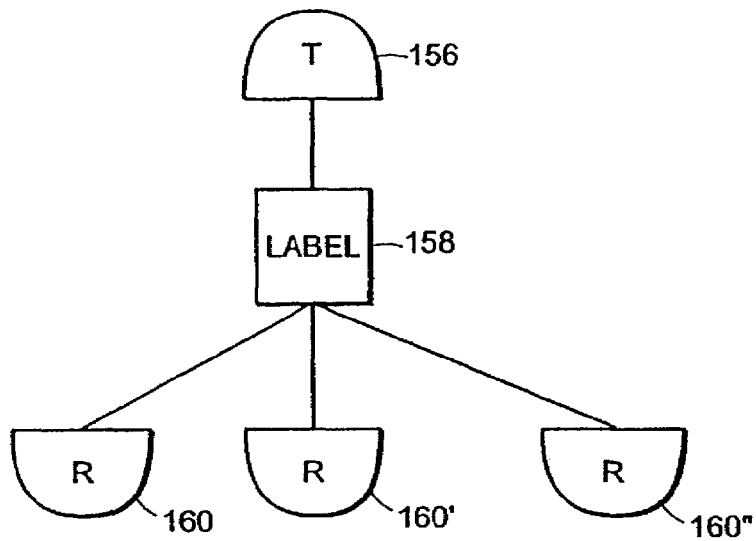
FIG. 3B
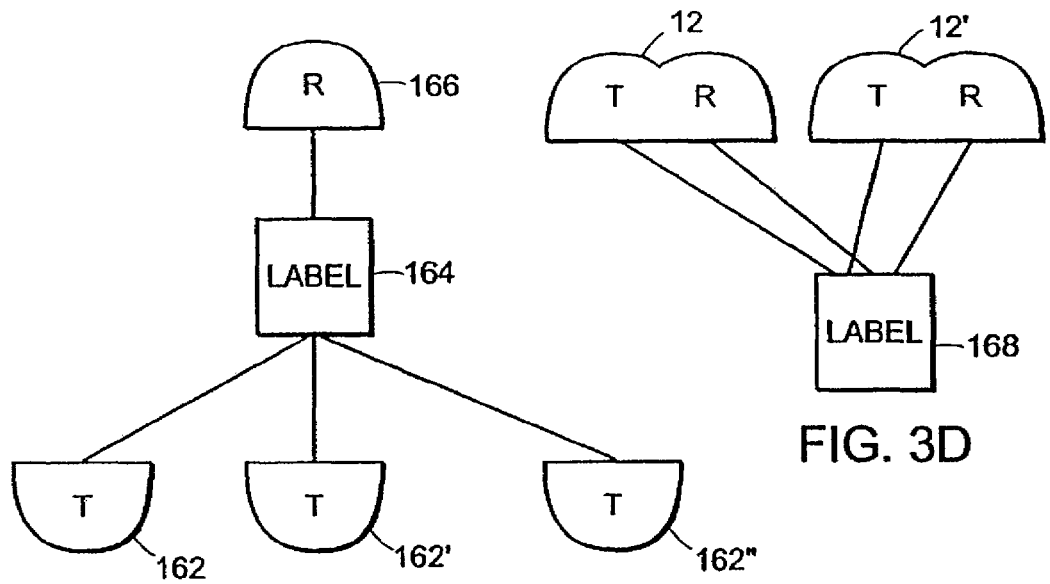
FIG. 3C
FIG. 3D

○ QUERYING NODE
◍ RESPONDING NODE

LOCAL CONNECTIVITY NUMBER = 2

○ QUERYING NODE
◍ RESPONDING NODE

LOCAL CONNECTIVITY NUMBER = 1

METHOD AND SYSTEM FOR ENABLING AND CONTROLLING COMMUNICATION TOPOLOGY, ACCESS TO RESOURCES, AND DOCUMENT FLOW IN A DISTRIBUTED NETWORKING ENVIRONMENT

CROSS REFERENCE TO RELATED APPLICATIONS

This application is a continuation of U.S. patent application Ser. No. 12/249,729, filed Oct. 10, 2008, now U.S. Pat. No. 8,127,039 which in turn is a division of U.S. patent application Ser. No. 10/012,708, filed Nov. 16, 2001, now abandoned which in turn claims the benefit of U.S. Provisional Patent Application Ser. No. 60/291,200, filed May 15, 2001. All of these applications are herein incorporated by reference in their entireties.

FIELD OF THE INVENTION

The invention relates generally to networks of computing devices. More specifically, the invention relates to facilitating communications among individuals, groups, and leaders using networked computing devices.

BACKGROUND

Most students now have occasional, supplementary Internet access at school, which has been sufficient to enable the initial growth of a large, diverse market of hardware, services, and content. However, within the tethered desktop or laptop paradigm, school access is unlikely to drop from the present 6:1 student-to-computer ratio to an ideal 1:1 ratio because of cost, installation, and portability issues. Hence, students will need to share a limited number of computers while at school and suffer from a lack of continuity between their computing environment at school and what they have at home (more than 60% of school-aged children now have access to a computer at home). This hardware shortage restricts individual access to school computing to less than 1 hour a week, on average, thus limiting students' opportunities to gain the highly-touted benefits of educational computing.

The market is rapidly developing affordable, powerful handheld computing devices and fast, easily installed, low-power wireless networks that may allow schools to overcome these limitations. In particular, mobile ad hoc networks (MANETs) are becoming readily available and highly attractive to schools for their low cost, ease of installation, and minimal maintenance. MANETs have a superset of the 802.11 capabilities that are available today: such networks support multicast, allow direct peer-to-peer communications without going through a central access point, support ad hoc networking, and provide an API (application programming interface) for controlling some key performance parameters.

A critical barrier to the acceptance of handheld (and wireless) devices in educational settings is the perception that the devices will enable disruptive "message passing" among students or cheating on tests. To overcome this barrier, teachers and proctors need a way of monitoring and blocking inappropriate student communication or computation. More generally, teachers need ways both of enabling particular kinds and patterns of communication and disabling others. In addition, because students can move around, and can work together in settings both inside different schoolrooms and outside of school altogether, controlled patterns of communication should be enabled without requiring a central communication hub, filter, or monitor. (Such a hub presents a single point of failure.) Further, it should be easy for teachers to designate particular roles for particular students without becoming network system administrators. Finally, it would be convenient if the process of choosing a particular destination for content was automated or simplified, so that students need not navigate complex choices to send or receive planned information flows.

SUMMARY OF THE INVENTION

One objective of this invention is to provide a framework that helps a teacher or other leader manage the use of computing (or communication) devices by their students in a classroom.

In one aspect, the invention features a method for use by a computing device to transmit information to at least one other computing device over a network communication medium according to a protocol stack having a plurality of protocol layers. The information is received at the particular protocol layer from a higher protocol layer in the protocol stack. At this particular protocol layer the computing device determines whether to transmit information over the network communication medium based on at least one term of a contract associated with the information. Upon determining to present the information to the network communication medium, the information is forwarded to a lower protocol layer in the protocol stack for transmission over the communication medium. An identifier is associated with each contract and becomes incorporated in information associated with that contract before that information is transmitted over the network communication medium. The information may be encrypted before being transmitted over the network communication medium.

In another aspect, the invention features a method for use by a computing device to receive information from at least one other computing device over a network communication. The computing device identifies at a particular protocol layer of a protocol stack a contract associated with information received over the network communication medium. The computing device receiving the information over the network communication medium extracts the identifier from the information, and after determining that the computing device has a copy of the contract, determines whether to send the information to a higher protocol layer of the protocol stack based on one or more terms of the contract. The information may need decrypting before being sent to the particular protocol layer.

Contracts can be transmitted and received to and from other computing devices over the network communication medium. Communication of the contract can occur using one of IR (infrared) beaming, RF (radio frequency) communication, and wired communication. Generally, the contract can pass over a secure communication channel. Computing devices and network resources store the contracts, and may store a plurality of different contracts. In general, stored contracts cannot be modified by any program other than a program that handles the contract protocol layer.

Each contract specifies one or more terms that the information associated with the contract must satisfy in order to be transmitted over the network communication medium. Such terms can determine which actions, if any, can be performed on the information by a computing device receiving the information. Each term includes a parameter such as a temporal parameter, an information-type parameter, an information-length parameter, and an information-content parameter.

If the terms of a contract allow, the user of a computing device that receives the contract can transmit a copy of the contract to the user of another computing device. The contract may be provided to a plurality of computing devices. In one exemplary configuration, the contract permits one of the computing devices having the contract to transmit information associated with the contract and another of the computing devices having the contract to receive information associated with the contract. In another exemplary configuration, the contract permits each computing device having the contract to transmit and to receive information associated with the contract.

In one embodiment, a computing device enters a secure mode of operation in response to information received over the network communication medium. The computing device can be placed in the secure mode of operation for a predefined duration. The computing device can issue a reply indicating that the first computing device has entered the secure mode of operation. The reply includes any one or a combination of (i) a certificate of authenticity, (ii) a certificate of integrity, (iii) a version number, and (iv) a characteristic of the computing device. An indicator on the first computing device is activated, verifiably showing that the first computing device is operating in the secure mode of operation.

The computing device can receive the information over the network communication medium from a security station. In one embodiment, the security station is a wireless access point in the control of a server system. In another embodiment, the security station can include an infrared beaming port. The security station can be located where a user of the first computing device entering a restricted zone necessarily passes near the security station.

The indicator can be any one or a combination of a sticker affixed to a visible surface of the computing device after the computing device is operating in the secure mode of operation, a detectable output produced by the computing device, or the capability of the computing device to respond correctly to a challenge. The detectable output can be any one or a combination of an illuminated LED (light emitting diode), an emitted sound, or a wireless transmission that indicates the computing device is operating in the secure mode.

A computing device that is operating in the secure mode is capable of correctly responding to a predefined challenge. The challenge may be received over a wireless network medium (IR or RF), wired network, or at the computing device. In one embodiment, the challenge includes providing a predefined input to the first computing device. In another embodiment, the challenge includes pressing one or more particular keys on a keyboard of the first computing device. The computing device computes a response that demonstrates the authenticity and integrity of the first computing device.

Entering the secure mode of operation includes prohibiting the first computing device from at least one of (i) communicating over a particular physical link, (ii) launching an application program, (iii) storing data in memory, (iv) reading data from memory, (v) installing software, (vi) communicating with hardware, (vii) accessing a particular system library, (viii) performing a start-up type of action, and (ix) placing a restriction on a specific application program. Another security-related feature is maintaining a session on the first computing device across a start-up type of event.

In yet another aspect, the invention features a method for providing a computing device with a capability to perform an interaction with a resource in a wireless network. A first message is transmitted from a first computing device to a second computing device to initiate a capability exchange. A response to the first message is received at the first computing device indicating a type of interaction that is supported by the second computing device. A second message including a contract corresponding to the type of interaction is transmitted from the first computing device to the second computing device to provide the second computing device with the capability to perform the interaction.

In some embodiments, transmission of the first message occurs when a predefined key of the first computing device is pressed, through an infrared transceiver of the first computing device, and includes transmitting type information representing content in the first message. The transmission can be a point-to-point transmission directed to a specific transceiver on the second computing device that is dedicated to respond to the first message. The information that corresponds to the interaction type can also be transmitted to a resource in the network to enable interaction between the second computing device and the resource.

In yet another aspect, the invention features an article of manufacture having computer-readable program means embodied thereon for communicating over a network communication medium. The article of manufacture comprises computer-readable program means for determining at a particular protocol layer of a protocol stack that a message is associated with a contract, and computer-readable program means for accessing the contract at the particular protocol layer to determine from at least one term of the contract whether to forward the message from the particular protocol layer.

In yet another aspect, the invention features a method of controlling access to an electronic resource. The electronic resource is given a contract that has an identifier. The contract specifies one or more conditions that determine the rules of communication with the electronic resource. When the electronic resource receives a communication, the electronic resource determines whether that communication has the identifier of the contract. If so, the electronic resource processes the communication. Otherwise, the communication is filtered out. Further, if that communication satisfies each condition specified by the contract, the electronic resource processes the communication; otherwise such communication is filtered out. The identifier of the contract is given to a computing device for inclusion in communications sent by the computing device to the electronic resource to enable the computing device to use the electronic resource.

BRIEF DESCRIPTION OF THE DRAWINGS

The invention is pointed out with particularity in the appended claims. The objectives advantages of the invention described above, as well as further objectives and advantages of the invention, may be better understood by reference to the following description taken in conjunction with the accompanying drawings, in which:

FIGS. 3A-3D are conceptual diagrams of four exemplary share-pair configurations;

DETAILED DESCRIPTION

Figures 1, 1A, 2:
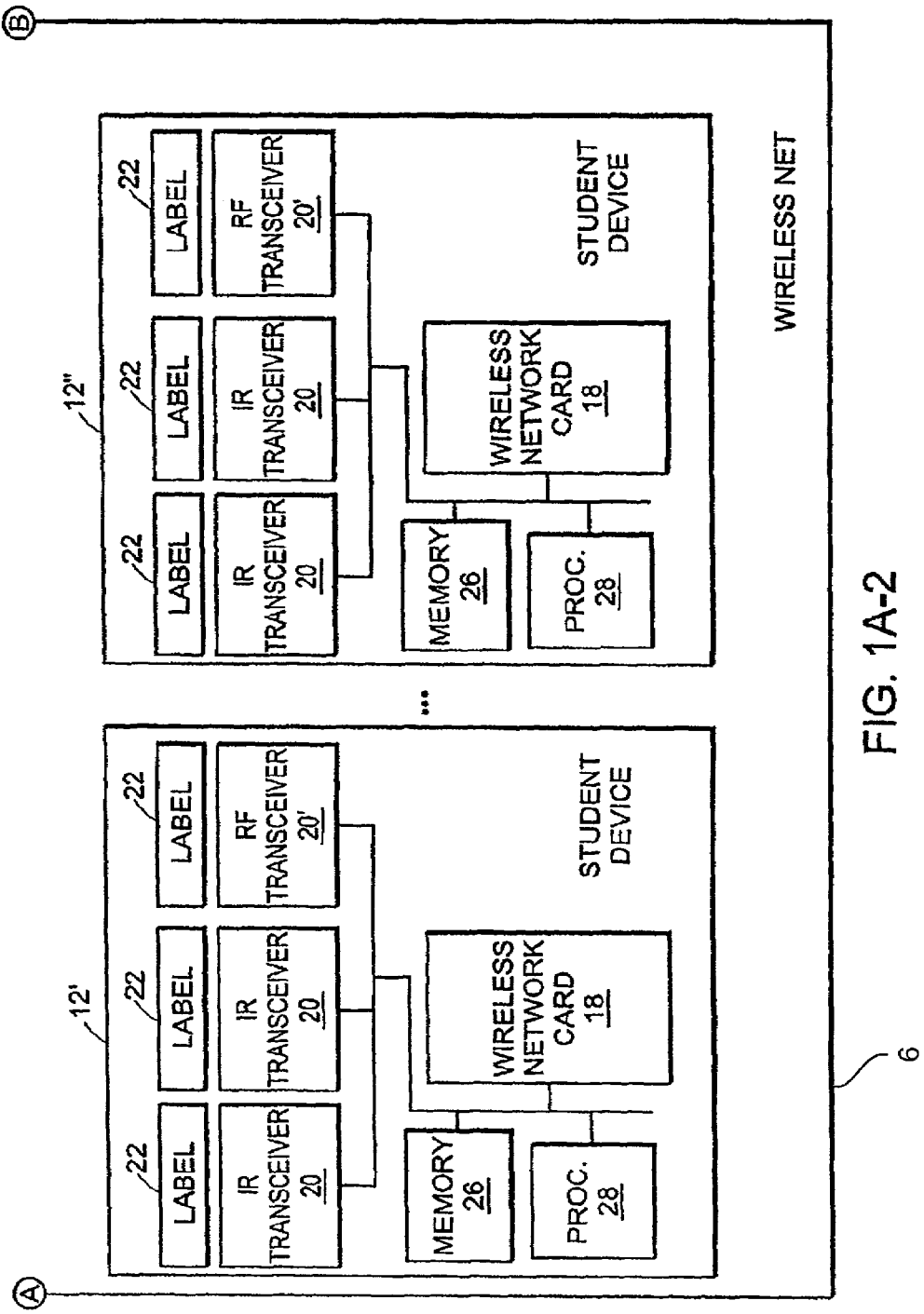
FIG. 1A is a block diagram of an embodiment of a network embodying the principles of the invention.
FIG. 2 is a flow diagram of an embodiment of a process by which one computing device transmits a "share pair" to a second computing device, to give the second computing device a specific capability.

To facilitate an understanding of the following description, we describe a classroom activity or game that illustrates generally the principles of the invention.

Consider that a teacher has a set of colored envelopes and a set of colored inboxes. The teacher distributes these envelopes and inboxes as follows:

on student A's desk (referred to as Suzie): Red envelopes; a Blue inbox; Green envelopes; and a Green inbox;

on student B's desk (referred to as John): a Blue inbox; Green envelopes; and a Green inbox;

on the Teacher's desk: Blue envelopes; and on the Printer desk: a Red inbox.

All communications in the classroom follow these rules:

1. Only someone with an envelope can send information. They send a message by putting the message into an envelope, sealing it, and throwing it into the air.

2. Once in the air, the envelope is duplicated and delivered to every single desktop (as described below, this mechanism is embodied as digital shared medium communication, in which duplication to every destination is the normal case).

3. Every participant in the classroom has agreed that if they receive an envelope for which they do not have the same colored inbox, they will immediately discard it.

Now, consider that the teacher puts a worksheet into a blue envelope and throws it in the air. Suzie, John, and the printer each get the blue envelope; the printer, however, lacking a blue inbox, discards it. Suzie and John open the blue envelope and read the message (i.e., the worksheet).

The message says "Make two lists. Step One: On one list, put five characteristics of mammals. On the other list, write five characteristics of reptiles. Put your lists in a green envelope. Step Two: If you have a red envelope, collect all the lists, including your own. Make an aggregated set of three lists "agreed mammal characteristic", "agreed reptile characteristic," "not sure." Print your aggregation by putting it in a red envelope.

Suzie makes her three lists, puts them in a green envelope, and throws it in the air. John does the same. The teacher, and the printer discard both green envelopes that they receive, but John opens Suzie's and grins "we agreed a bunch" Suzie says, "yup, but I don't agree that all reptiles live on land.

She makes a new message with three lists, places the message in a red envelope and throws the red envelope in the air. The printer, having a red inbox, opens the red envelope and prints the list. The teacher and John receive the red envelope too, but lacking a red inbox throw the red envelope away.

The scheme of colored envelopes and colored inboxes conceptually illustrate a principle of the invention referred to as "share pairs." Each color represents a kind of communication. The envelopes and inboxes with the same color form a share pair that together regulates information exchange: only students with an envelope may transmit and only students with a matching inbox may receive. An envelope represents a contract between the teacher and a first student: it gives the first student the capability to transmit a message with the given identifying color. An inbox represents another contract between the teacher and a second student: it gives the second student the capability to receive a message with the given identifying color. This pair of contracts thus contractually regulates sharing of information among the first and student students, hence the term "share pair." By creating share pairs and handing out each half to different student desks, the teacher structures the possible communications, communication topologies, access to resources, and document flow.

Moreover, note that two kinds of communication appear in the game. More specifically, the teacher uses a first type, directed one-to-one communication, to regulate a second type, shared-medium communications. When the teacher hands an envelope or inbox to a student, she is engaged in the first type, that is, directed one-to-one communication. Afterwards, when the students use envelopes and inboxes to communicate, they use the second type, shared medium communication (i.e., every envelope is broadcast to every receiver). Accordingly, the share pairs regulate shared medium (e.g. wireless) communication.

Further note that the principles of share pairs operate without a centralized message router; once students have envelopes or inboxes, messages do not pass through a single controlling filter. Also, by employing different ways of distributing envelopes and inboxes, the teacher can orchestrate a wide variety of possible communication flows, but no single participant ever needs to know all the flow rules. Each participant has only those rules that pertain to information that the particular participant may send or receive. Consequently, the information to control information flow is decentralized, and there is no single point of failure in the system.

An issue that may arise with the share-pair scheme as described above is that anyone who has an envelope can put anything they like in that envelope. Consequently, Suzie and John can exchange, for example, their favorite baseball trading cards by using green envelopes, a practice that the teacher does not abide in her classroom. Thus, the teacher seeks control over what content is copied over the shared medium.

Accordingly, from now on, messages are no longer be wantonly thrown into the air. Instead the teacher distributes outboxes with the same color to each student that has an envelope. The outbox enforces contract terms which regulate transmissions. These terms state rules that the envelope and its contents must obey in order to pass through. These rules govern the size, type, and other properties of the envelope and its contents. Only envelopes that satisfy the rules may now enter the shared communication medium. (Similar contracts govern inboxes.) Now the teacher can control not only topologies of communication, but also what sorts of content can flow along each possible route.

In one variation of the game, there are no separate inboxes and outboxes. Instead, the contract can govern whether a box can be used for input, output, or both. A "share pair" is a matching set of contracts, with a given color for the whole set. From this set, the teacher can choose specific contracts to attach to each box she hands out, and thereby create restricted patterns of envelope transfer among all boxes with the same color. Again the teacher need not maintain any centralized list of all the contracts; the information is decentralized and not sensitive to any single point of failure.

When different boxes of the same color have asymmetrical but matching contracts (e.g. they both admit the same types of content, but one contract allows only transmitting and the other contract allows only receiving), the contracts together enable particular direction of flow of a certain color of envelopes. By combining a small set of basic contractual types, the teacher can create a wide diversity of desirable information flow models, including "distributing" a worksheet to everyone in class, "collecting" homework from each individual, "sharing" information among designated teams, and "accessing" designated resources.

Content Routing

Another issue that may arise is that students may have difficulty remembering what kind of thing (i.e., content) goes in what color envelope. To mitigate this complexity, each participant has an automated "envelope stuffer," which can accept any kind of message, that determines for the participant what color envelope to use.

Upon receiving a message for transmission, the envelope stuffer checks every available contract, to see if any can potentially transmit this message. If only one contract can transmit the message, stuffer selects the envelope matching that contract, and the envelope is placed in the outbox. If more than one contract can transmit the message, the user is presented with a choice among the possibilities.

The teacher may now put colored stickers on response cards that she gives to the students. Now when the teacher sends the worksheet, it includes two cards. One card has space for two lists, and the other card has space for three lists. The two-list card has a green sticker, and the three-list card has a red sticker. The contracts include terms that allow a card with a given color of sticker to be transmitted. Consequently, the students can just put their completed cards in the stuffer. The stuffer then automatically selects a red or green envelope selected for the cards.

Hip Hop Multicast

As it turns out, consider that broadcasting every message so as to reach every desk consumes too much energy. A variation of the game solves this problem. Instead of throwing an envelope the air so as to reach every desk in a classroom, each participant lightly tosses the envelope such that copies only land on desks within a short (e.g., six-foot) radius. A new rule is added to the system; every desk that receives an envelope makes a copy, and then lightly throws that copy back into the air. Eventually, every desk receives at least one copy of the envelope, provided the desks are reasonably densely packed.

This can present a problem: the air is constantly full of repeated throwings of the first envelope, and so no other envelopes can pass through. Another rule addresses this problem by introducing a "count for a while, then decide" methodology (hereafter referred to as "Hip Hop multicast"). Each desk waits a while, and while waiting, counts how many repetitions of a message that it receives. If the wait time ends before the desk's count reaches a threshold, the desk resends the message. Due to the wait and count step, the first message is repeated only a finite number of times, but enough times to assuredly reach every desk.

Data Migration

Consider that the printer jams just after opening Suzie's red envelope, and cannot complete her print job. Worse, Suzie has left class, and so the printer cannot ask her to resend the file to be printed again.

To address the problem of "missed communications", a description of the contents can be attached to each envelope, e.g. a file name. Further, recall that according to the Message Hop methodology a student keeps every envelope for a while, to decide whether to retransmit that envelope. As a variation, the student retains all envelopes that are received in a cache (at least until the cache fills up). As messages pass through the air, the cache accumulates colored envelopes with associated file names. The cache can include colors of envelopes for which the desk has no inbox or outbox.

Further, inboxes are permitted to query for pending transfers from all the desks that share its airspace. Hence, the printer can ask "any red envelopes for me?" Each desk searches its cache, and returns a list describing the red envelopes that it has available. The printer can select the red envelope it wishes to receive, and send another query "please send the red envelope entitled 'Suzie's lists.pdf' to me." Each desk searches its cache, and returns that envelope if it has it.

This capability allows the system to solve "missed communication" problems by finding copies of recent communications in cache. Further, the capability solves "late corner" problems by allowing a participant that was "offline" (i.e., not in the classroom) during a recent wireless transmission query to see what was sent recently. Indeed, it is possible that Suzie could get a copy of the worksheet in class, but John might be at home sick. When they later meet at a cafe, John could get all the recent green and blue items from Suzie.

FIG. 1A shows embodiments of a network 2 constructed in accordance with the principles of the invention. In one of the embodiments, the network 2 includes a plurality of computing devices 12, 12', and 12" (generally 12) in communication with each other over a wireless medium to form a wireless communication network 6. As indicated in the Drawings, FIG. 1A has been split into FIG. 1A-1 and FIG. 1A-2 in order to accommodate all of the illustrated features of the network 2. When viewed together and in accordance with the illustrated connections (indicated by the letters "A" and "B" in circles), FIG. 1A-1 and FIG. 1A-2 collectively form FIG. 1A.

In general, the invention is useful in environments where one or more leaders, teachers, or instructors instruct or address individuals and groups of individuals. In one embodiment, the network 2 is implemented within an educational environment, such as a classroom having at least one teacher and a plurality of students. In this embodiment, each teacher and student has a handheld portable computing device 12. Class participants are connected by the wireless network 6. For illustrating the invention, consider that the teacher operates the computing device 12 (hereafter, teacher device 12), and the students operate one of the computing devices 12', 12" (hereafter, individually, student device 12' and student device 12", and generally student device 12'). Hereafter, references to a computing device 12 refer generally to computing devices, which can be a teacher device, 12, a student device 12', or both.

In a classroom having a teacher and a plurality of students, a variety of interaction or activity topologies arise among such classroom participants. For example, the teacher can place students into project groups with an assigned group leader where information is shared among group members. As another example, the teacher can require the students to work individually on an assignment, test, or quiz. The overall pattern of interactions among the student devices 12' and the teacher device 12 in a classroom (and the corresponding links between the classroom participants) can become complex. Each set of interactions among student devices 12' and the teacher device 12 and the corresponding links defines an interaction topology.

Within these complex topologies, the teacher wants to be able to control the message or document flow among the students. For example, the teacher would not want students to be able to work together in groups for an assignment that requires individual effort, such as a test. Yet, there are moments in the classroom when students should be able to share documents, such as when the students are working together on a project.

Computing Devices

Typically, the computing devices 12 are battery-operated, portable devices capable of wireless communication (point-to-point infrared (IR), shared medium radio frequency (RF), or both). Examples of such computing devices 12 include but are not limited to personal digital assistants (PDA), tablet-based and laptop computers, calculators, mobile phones, handheld gaming devices, and picoradios.

In another of the embodiments, the network 2 further includes electronic resources such as a printer 14, a projection display 14', and a robot 14'' (generally 14) connected to a wireless access point 16. In this embodiment, the wireless access point 16 is a part of the wireless network 6. The electronic resources 14 (also referred to as network resources) shown are simply exemplary; other types of electronic resources, such as, but not limited to, scanners, fax machines, and data collection devices, can be in the network 2 embodying the invention. The electronic resources 14 are part of a wired data communication network 10. In some embodiments, one or more of the computing devices 12 can be part of the wired network 10 rather than or in addition to being part of the wireless network 6. The wired network 10 can be a WAN (wide area network), LAN (local area network), or client/server network. The wired and wireless networks 6, 10 are connected to each other through the wireless access point 16. The wireless access point 16 serves as a shared RF wireless transceiver for the electronic resources 14 on the wired network 10. In some embodiments, one or more of the electronic resources 14 is local to the computing devices 12 and have an RF transceiver. In such embodiments, the electronic resources 14 can communicate with the computing devices 12 directly through the RF transceiver (i.e., the wireless access point 16 is not needed for such RF communication). Some computing devices 12 can require a connection to an AC outlet or not be portable, such as desktop computers.

Point to Point Transceivers

Computing devices 12 can have one or more "point-to-point" short-range wireless communication transceivers 20, 20' (generally 20). Examples of these transceivers 20 include infrared (IR) and very short range (e.g. Personal Area Network or PAN) radio frequency (RF) transceivers (sometimes referred to in the art as "cable replacements"). (In FIG. 1A, IR transceivers are designated 20 and PAN RF transceivers as 20'.) IR transceivers 20 include an IR emitter and IR sensor for point-to-point exchange of information with a peer device (a process called "beaming"). RF transceivers 20' include an antenna for broadcasting and receiving information to and from peer devices within broadcast range and tuned in to a predetermined frequency spectrum (e.g., 900 MHz and 2.4 Ghz).

Multiple, Spatially Distinguished Point to Point Transceivers

In general, the physical distribution of short-range "cable replacement" wireless connections can be used to give a user choice among differentiated capabilities of an overall network system 2. More specifically, in some embodiments the computing devices 12 (and electronic resources 14) have more than one point to point transceiver 20. In such embodiments, the transceivers 20 are spaced sufficiently far from each other so that each transceiver 20 can communicate independently of the other transceivers 20. Each transceiver 20 can be integral to the body of the device 12 or attached to the device 12 by short wires or other network cabling means such as ethernet cabling. For computing devices 12 and electronic resources 14 with multiple transceivers 20, short wires can increase the spatial separation between the transceivers 20.

A unique label 22 (e.g., human readable text, color-coded, and bar-coded) is associated with one or more of the transceivers 20 (IR or RF) on the device 12 to make that transceiver 20 distinguishable from the other transceivers 20 on or attached to the computing device 12. Each label 22 helps identify the functionality of the associated transceiver 20 to users of that and other computing devices 12. In one embodiment, the labels 22 are permanently affixed to the transceivers 20 and identify the default transaction that is associated with interacting through that transceiver 20.

Such a set of labeled transceivers 20 illustrate a physical embodiment of a computer program "menu"—one such menu for each computing device 12 and for each electronic resource 14—with each transceiver 20 representing one menu item. If there are fewer transceivers 20 than fundamental transactions performed by the computing device 12, one or more of the transceivers 20 can represent a transaction class or type or instance, and the selection of one transaction class can appear as a computer program menu during the interaction process with that transceiver.

In embodiments with the computing devices 12 and resources 14 that have multiple spatially separated transceivers 20, the teacher can arrange or organize the classroom to optimize and to facilitate the flow of information between the teacher and the students. For example, each transceiver 20 is given a label indicating a function of that transceiver 20, e.g. "Update Software Here", "Get Homework Here", "Turn In Homework Here", "Get Test Here", and "Turn In Test Here." Transceivers 20 for distributing today's homework and for collecting last night's homework can be positioned at a classroom egress through which the students necessarily pass. Other transceivers 20 for distributing tests and for receiving completed answers can be situated near a security station (described below) that enhances testing security. Thus, rather than having to navigate a computer user interface to accomplish different functions, students and teachers can move spatially to the physical location of distinct, separate functionalities. Further, for each function, there can be an array of transceivers 20, to allow many students to use the function in parallel. For example, there can be three beaming points that support "turning in homework."

Shared Medium Transceivers

Because such computing devices 12 are portable and have wireless communication capabilities, their users can move about freely and remain part of the network 2. Further the users may be able to communicate without their messages flowing through a central hub. Networks that operate without a coordinating central hub are conventionally designated "ad hoc." Consequently, the wireless data communication network 6, of which such computing devices 12 are a part, is generally referred to as a wireless Mobile Ad-Hoc Network (MANET).

Thus the computing devices 12 can have a shared-medium wireless networking transceiver (e.g., IEEE Standard 802.11). By shared medium, we mean that generally speaking all messages can be heard by all transceivers within range; directed point to point communication is not possible. Shared medium communications is typically added to a computational device in the form of a network card 18, 18' (generally shared-medium transceiver 18) in communication with other networking cards 18 and, for some embodiments, with the wireless access point 16. The wireless access point 16 also has a shared medium wireless networking transceiver 18, typically in the form of a plug in card. The shared medium wireless networking card 18 and each of the short range point-to-point transceivers 20, 20' are in communication with memory 26 and a processor 28. Accordingly, in the exemplary embodiment shown in FIG. 1A, computing devices 12' and 12" each has four wireless transceivers: two IR transceivers 20, one short-range PAN RF transceiver 20', and one shared medium transceiver 18; and the computing device 12 has two transceivers: an IR transceiver 20 and a shared-medium transceiver 18.

In networks 2 with electronic resources 14, each electronic resource 14 includes one or more IR transceivers 20 and a wired network card 24. The wired network card 24 is wired to the wireless access point 16. Instead of the wired network card 24, the electronic resources 14 can include a shared-medium wireless networking transceiver 18. In such embodiments, the computing devices 12 can engage in wireless communication with the electronic resources 14 directly with the transceiver 18, instead of by way of the wireless access point 16. In the exemplary embodiment shown in FIG. 1A, the printer 14, projection display 14', and robot 14" each have an IR transceiver 20 and a wired network card 24 connected to the wireless access point 16.

Figure 1B:
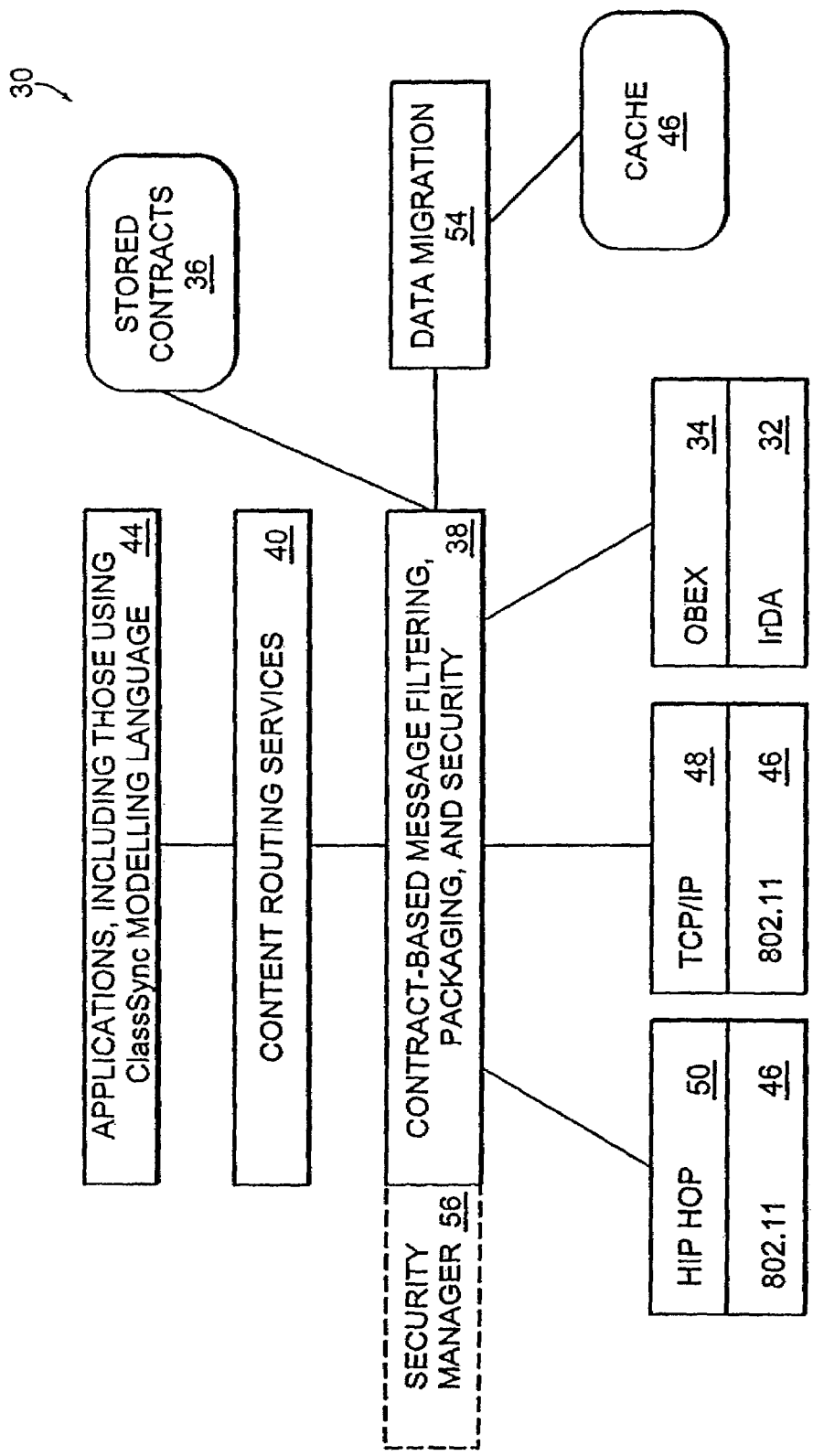
FIG. 1B is a diagram of an embodiment of a protocol stack used by computing devices in the network to communicate with each other and with network resources.

Not all students and teachers are necessarily always connected to the MANET 6 or to each other. For example, students can leave the classroom with their devices. Also, the members in a group of students do not need to be congregated in a single location, but can move to and work at distributed locations in the classroom Protocol Stack Network communication among the computing devices 12 and resources 14 is generally conceptualized in terms of protocol layers, such as the physical, data link, transport, and session layers, and such protocol layers form a protocol stack. FIG. 1B shows one embodiment of a protocol stack 30 by which the computing devices 12 can electronic resources 14 communicate with each other.

The protocols used at the lower layers of the protocol stack 30 depend upon the type of physical medium over which the computing devices 12 communicate. For example, the lower layers of the protocol stack 30 for IR communications include an IRDA-compliant (Infrared Data Association) physical layer 32 and an OBEX (Object Exchange) session layer 34 that runs over the lower layer of IRDA. The lower layers of the protocol stack 30 for RF communications include an RF physical layer 46, a TCP/IP transport layer 48 that runs TCP/IP over wireless technology for communicating over short-range radio links, such as Bluetooth, 802.11 (b) or HomeRF. Alternatively, RF or IR communications may use an alternative medium control protocol 50, such as Hip Hop multicast. Hip Hop multicast and share pairs work well together because the Hip Hop multicast addresses refer to a channel in the shared medium, not a computing device 12, and share pairs control which devices 12 can send or receive messages from a particular channel.

For IR and RF communications, the other layers of the protocol stack 30 include a contract layer 38 that manages filtering, packaging and security via contracts 36, a data migration service 54 which manages a cache 46 of recently transmitted messages, a content routing layer 40, and an application layer 44, which may utilize a ClassSync modeling language (CML) described in more detail below.

As described in more detail below, the contract layer 38 receives contracts that have been beamed to its computing device and stores them;

the contract layer 38 subsequently filters communications based on contracts associated with such communications;

the data migration layer 54 caches messages and responds to queries from other devices 12 to describe and potentially retransmit cached messages;

the Hip Hop (or multicast packet hop) layer 50 provides a protocol for routing packets through the network 2 in the case where information is transmitted and received via Hip Hop multicast;

the content routing layer 40 associates contracts with messages before transmission, and associates application handlers with messages after reception; and the class modeling language layer 44 specifies an underlying architecture upon which applications can draw in presenting to users a graphical or procedural language that systematically describes the various patterns of classroom interactions that are planned for particular classroom activities.

During operation, software executing on a computing device 12 prepares a document for transmission to another computing device 12 over the wireless network 6. Every document transmitted over the network 6 includes a label or identifier that identifies a corresponding contract. Application software may associate the contract and document directly, in which case the next layer (i.e., the content routing services layer 40) can be skipped. If the application software does not associate a contract with the document, the document next passes to the content-routing services layer 40. At this layer 40, a process chooses an appropriate contract for the document, by analyzing the document and any descriptors the application has made available. When the document passes to the contract layer 38, software operating at this layer 38 determines whether the document can be sent over the network communication medium. If so, the document is processed at the appropriate lower layers of the protocol stack 30 based on the type of communication medium (IR or RF). Consequently, the document is passed to the network communication medium with an identifier corresponding to the contract associated with the document. Additional information may be passed to the lower layers as necessary to enact the transmission, such as a multicast IP address associated with the contract.

A computing device 12 receiving the document over the network communication medium processes the document at the lower layers of the protocol stack 30. Again, the particular protocol layers processing the communication depend upon the type of communication medium over which the communication is received. For example, if an IR communication is conveying the document, the IR physical layer 32 and an OBEX/IRDA layer 34 process that communication in succession.

At the contract layer 38, software determines whether to pass the document to a higher layer of the protocol stack 30. Prefiltering criteria may be used before contracts are applied. One prefiltering criterion can be whether the multicast IP address associated with the document is a multicast IP address that the receiving computing device 12 is permitted to process. Another prefiltering criterion can be whether an identifier or descriptor accompanying the document identifies content that the receiving device is permitted to process. Other prefilter criterion can be used to filter the communication. If the communication does not satisfy the prefiltering criterion or criteria implemented at the contract layer 38, only the data migration services 54 can further process the communication; from the point of view of application layers 40 and 44, the communication is discarded.

If the communication passes the above described "prefiltering", the contract layer software determines whether the receiving device 12 has a contract with a identifier that matches the contract identifier associated with the document. Without the contract, the receiving computing device 12 is unable to process the communication further; only the data migration services 54 can further process the communication; from the point of view of application layers 40, 44, the communication is discarded. If the receiving computing device 12 has the matching contract, the communication is then processed in accordance with the terms of the contract, as described in more detail below. If permitted by the term or terms of the contract, the document passes to the content routing layer 40, which determines the content of the document (e.g., homework) and routes the document to the appropriate software for handling that content, such as an application program that collects and grades homework.

Contracts

In accordance with the principles of the invention, the teacher (or other leader) enables and controls distributed communications, access to network resources and document flow over complex network topologies using contracts to assign capabilities among the students. In general, a contract defines the rules of communication; a computing device 12 without a contract cannot communicate. More specifically, a contract creates a capability of a student's computing device 12' to do some action, subject to the various parameters established at transmission (e.g., time, controlled device address, etc.) of that capability.

Generally speaking contracts are paired with each contract in a pair containing reciprocal terms. One contract may allow transmission; the other may allow receiving; and both contracts have identical terms with respect to the kinds of content they pertain to. By giving a first student one contract and a second student another contract, both contracts belonging to the same share pair, the teacher can regulate the kind of sharing those students engage in. Since from the teacher's view, the control of sharing is the object of interest (and the paired contracts are instruments to that end), we use the term "share pairs."

Each contract has an identifier, and all contracts implementing the same share pair use the same identifier. In one embodiment, the contract identifier is a human-readable text string that describes the intended communication in a concise way. For example, if the classroom of students has been divided into groups, each group can have a unique name (e.g., "bluebirds"). Accordingly, contracts for the share pair that controls communication among this group can have an identifier that is the text string "bluebirds".

This identifier can be used at the contract layer 38 to filter communications received over the network communication medium. Devices 12 that do not have a contract with the identifier "bluebirds" do not pass communications with this label to the application layer 44. Devices 12 that do have a contract with the identifier "bluebirds" will ensure that the communication is allowable under the terms of the "bluebird" contract in the memory of that device 12. Only after all such terms are met, does the contract layer 38 pass the communications through to the applications layer 44. Thus, attaching an identifier with content supports rule-based application-level processing of communications.

In general, teachers create share pairs and distribute the contracts within the share pairs to students, and the students associate the contracts they receive with particular communications (e.g., documents and messages) that are transmitted over the network 2. To achieve these functions, the teacher device 12 is equipped with application software for defining the terms of the contracts (described below), and the student devices 12' with application software that enables the student to select and incorporate the identifier of the selected contract in a communication. As an example, a student can choose a contract for association with a particular communication based on the content of the communication. For example, a student selects a contract labeled "Homework" with a particular communication that contains "homework."

The contract includes information (i.e. terms) that a recipient computing device 12 or resource 14 can query to determine if data associated with the contract can be processed by the next protocol layer. That is, the set of all contracts resident in memory on a computing device 12 define (1) the possible data flows through which all data received by lower protocol stack layers are passed to applications at the application layer, and (2) the possible data flows through which all data queued for transmission by higher protocol stack layers are passed to transport layers. The contracts operate as a filter of all incoming and outgoing communications.

The contract information (also referred to as conditions or terms of the contract) includes, but is not limited to, one or more of the following components. By these various types of contract information, a limitless variety of contracts are possible.

An item selector component provides a name to the contract, such as "homework", "handout", "quiz". In general, the item selector is a short name that is displayed to the student on a user interface, such as a pop-up window listing various types of contracts with which to associate to a particular communication.

A metadata component indicates a type or category of data that a computing device 12 having the contract can run. The metadata can specify one or more of a plurality of possible types, including classroom-based custom types (such as homework, test, quiz, group work), the MIME-type (Multipurpose Internet Mail Extensions) of the data, and data-descriptors based on the content of the data.

A temporal component indicates whether the computing device 12 can now perform the capability associated with the share-pair. In one embodiment, the temporal component is based on one or more temporal parameters, such as expiration date, time of day, month of year, duration (e.g., a metadata component of type "test" may have a time limit of two hours), or other compound temporal parameters. Capabilities given to a computing device 12 by this component have a temporal aspect. For example, a teacher can design a contract for use during a two-hour examination that enables the computing device 12 to access a particular network resource 14 but expires upon expiration of the two hours.

An I/O (input/output) type component specifies the type of input and output actions that the device having this contract is able to perform (e.g., read, write, or execute) the data attached to the contract.

A length component specifies the size of messages that the device 12 can handle.

Another string specifies a user description of the contract. In one embodiment, this string describes the purpose and parameters of the contract.

An alphanumeric field specifies a key used to encrypt data.

A priority component specifies the priority of the share-pair that can be used, for example, to determine the queuing of communications, especially if the network 2 becomes congested.

Giving Contracts

Upon deciding to assign a communication capability to a student (or to a group of students), the teacher device 12 beams or broadcasts the contract for that capability to the student device 12'. In one embodiment, the teacher approaches the appropriately labeled IR transceiver 20 of the student's device 12', aims the teacher's IR transceiver 20 of the teacher device 12 at the student's IR transceiver 20, and initiates a beaming transaction between the two computing devices 12, 12'. As indicated above, if there are fewer transceivers 20 on the student device 12' than interaction types, a menu can appear on the display of the teacher's device 12 offering the teacher a selection of interaction types to choose from. The recipient device 12' stores the contract in memory 26 accessible to its contract layer 38. In a secure implementation, contracts should be stored in memory that can be read or written to only by code that implements the contract layer 38. That code can be protected from tampering by residing in a kernel not accessible to normal application programs on the device.

Communication with regard to the student device 12' has been described. In one embodiment, resource devices 14 may also be given a contract within a share pair. For example, the teacher may want to regulate communications between a student and a printer. To this end, upon completing the beaming interaction with the student device 12', with the student's device 12' storing the share-pair in memory 26, the teacher moves to the intended resource 14 and similarly initiates a beaming transaction. When the transaction with the resource 14 is completed, the student's use of the resource 14 through the wireless and wired communication network 2 is automatically enabled.

In most cases, a teacher gives a contract to a student by a single communication. In one embodiment, the contract is packaged as an object and transmitted from teacher device to student device via the Object Exchange (OBEX) protocol. The object type is sent as part of the transmission, and makes it clear to the student device that the received object is a contract. The contract layer 38 registers itself as the handler application for all incoming contract objects. Upon receiving a contract, the contract layer 38 processes the contract by storing the contract in memory.

Distribution of the share-pairs can occur over a secure communication channel. To achieve the secure communication channel, the teacher, who regulates the distribution of the share-pairs, uses point-to-point IRDA to beam encryption keys to a student device 12' for its secure control channel. This point-to-point communication brings the teacher within proximity of the student; thus the teacher can use authenticate the student without cumbersome authentication procedures by simply observing the physical identity of the student. Accordingly, when a new student joins the classroom, the teacher can beam a communication to the new student device 12', welcoming the student by name to the class, informing the student of her assignment to an team, and instructing her to join her team members. The new student can then join the team members and start synchronizing her student device 12' to share the documents belonging to the team.

Giving Contracts as a Capability Exchange

In an alternative embodiment, teachers can give contracts in the style of a capability exchange. This embodiment requires three communications, the teacher sends a query to the student, the student sends a response, and the teacher grants a contract. FIG. 2 shows an embodiment of this process in more detail. In this process the teacher device 12 transmits a share-pair to the student device 12', in this example by IR beaming, to give that student device 12' a specific capability (e.g., the ability to use an electronic resource 14). To initiate the transfer of the share-pair, the teacher moves the teacher device 12 to within range of the student device 12', and points the IR transceiver 20 at the appropriate IR transceiver 20 on the student device 12'. The label 22 associated with the student IR transceiver 20, if any, can assist the teacher in aiming the IR beam.

In step 100, the teacher device 12 runs a configuration application that responds to the press of a pre-defined key by transmitting a first message over the IR transceiver 20 of the teacher device 12, using the OBEX (IrDA object exchange) protocol. According to the OBEX protocol, a content type of the first message, in addition to the contents of the first message, can be indicated as part of the transmission. The configuration application chooses the type of the first message so that the student device 12' receiving the first message associates the first message with a predetermined configuration handler application. For example, the contents of the first message can indicate that the teacher 12 is initiating a capability exchange, and the type of the first message causes the receiving student device 12' to launch software to accomplish that exchange Upon receiving of the first message, the student device 12' runs (step 104) the corresponding configuration handler application associated with the type, of the first message. The first message and an indication of which IR transceiver 20 (if the student device 12' has more than one transceiver 20) passes as input to the configuration handler application. From the contents of the first message, the configuration handler application determines (step 106) that a capability exchange is desired.

The configuration handler application responds (step 108) by sending a second message, of the type associated with the configuration application executing on the teacher device 12, through that IR transceiver 20 by which the student device 12' received the first message. The contents of this second message include an indication of the interaction type that the configuration handler associates with the IR transceiver 20 over which the first message was received. For example, the interaction type can be to send a document to a printer. If the receiving student device 12' supports more interaction types than IR transceivers 20, the contents of the second message include a list of supported interaction types.

Upon receiving the second message, the configuration application executing on the teacher device 12 creates (step 112) a third message including a share-pair element (i.e., identifier and contract) appropriate to the interaction type. When the contents of the second message include a list of interaction types (rather than a single interaction type), the configuration application first presents the list to the teacher in human readable form and allows the teacher to choose one of the interaction types from the list. In one embodiment, the third message includes an IP multicast address, a password or other cryptographic element, and duration or time of validity for the third message. In this embodiment, the IP multicast address is deemed bound to the transmitted share-pair.

The configuration application executing on the teacher device 12 then transmits (step 116) the third message, again with the message type that is associated with the configuration handler application on the student device 12'. The configuration application on the teacher device 12 also reserves (step 120) a copy of the third message, suitably modified as regards any cryptographic element of the third message to correspond to the contents of the third message.

Upon receiving the third message, the configuration handler application on the receiving student device 12' saves (step 124) the contents of the third message in memory 26 for later use, invalidating any previous messages whose interaction type would conflict with this third message.

The teacher then carries the teacher device 12 to the IR transceiver 20 of the target resource 14 whose use the teacher wishes to provide to the student. Upon pressing the pre-specified button a second time, the configuration application on the teacher device 12 conducts the interchange with the resource 14 as described above. In particular, the configuration application sends (step 128) a fourth message (identical to the first message), which is received by a configuration handler application on the target resource 14. The type of the fourth message causes (step 132) execution of a configuration handler application associated with that type. The configuration handler application on the target resource 14 responds (step 134) with a fifth message similar to the second message. The fifth message includes the interaction type or list of interaction types in the contents.

Upon receipt of the fifth message, the configuration application on the teacher device 12 confirms (step 136) a match between the interaction type indicated in the copy of the third message held in reserve and the interaction type indicated in the fifth message. If the fifth message contains a list, the configuration application looks for a match with one of the interaction types in that list. If no such match can be made, the configuration application indicates (step 140) an error condition to the teacher. Otherwise, the configuration application transmits (step 144) the modified copy of the third message held in reserve as the sixth message, which the configuration handler application on the target resource 14 by saving the contents of the sixth message in memory 26 for later use.

At this point, and for the duration that the share-pair is valid, whenever an application executing on the student device 12' or on the target resource 14 engages in a communication activity of the type indicated in the third and sixth messages, the student device 12' or resource 14 runs the respective configuration handler application associated with that type. The configuration handler application engages the wireless network card 18 to transmit to, and receive from, the multicast address indicated in the share-pair, and to engage the cryptographic element or password to confirm the propriety of the communication to the other computing device 12 (or resource 14) listening to the same multicast address.

Security Manager

In some circumstances, a teacher might want more global control of overall communication capabilities than is practical by managing individual contracts. Further the teacher might need to assert this global control more securely, for example, while proctoring an examination. To accommodate this desire, in one embodiment a "master" contract is sent to every student. This master contract supersedes all other contracts, and further filters communications. It may, in fact, turn off all subsequent communications for the duration of the examination. Further, in one embodiment, the notion of contract layer 38 is expanded to also filter system events other than communications. Such a contract layer 38 prohibits certain applications from being launched, for example.

To create a secure environment for safe execution of handheld applications during defined class periods, the student devices 12' include firmware that implements the security manager 56 within the contract layer 38, referred to in FIG. 1B and described in more detail below. In brief overview, each student device 12' that supports the security manager 56 has an identifying logo, and is responsive to a challenge that demonstrates the authenticity and tamper-free status of the security manager 56 on that student device 12'. While in a security-managed mode (hereafter secure mode), the student computing device 12' provides an indicator that a teacher or proctor can easily detect (e.g., by glancing at a computing device 12' with a flashing LED).

Generally, invoking the security manager 56 follows the "capabilities exchange" variant of granting a contract as described above. That is, the teacher sends a message ("a challenge") to the student device. Based upon the student response, the teacher device 12 determines whether the student device 12' has a valid security manager 56 in its contract layer 36. If the teacher device 12 decides affirmatively, the teacher device 12 sends the student device 12' a contract (i.e., the master contract) that supersedes all other contracts and lasts the duration of the examination. If the teacher device 12 decides negatively, the teacher takes steps to prevent the student from using the student device 12' during the examination (e.g. by taking the device away).

Figure 2:
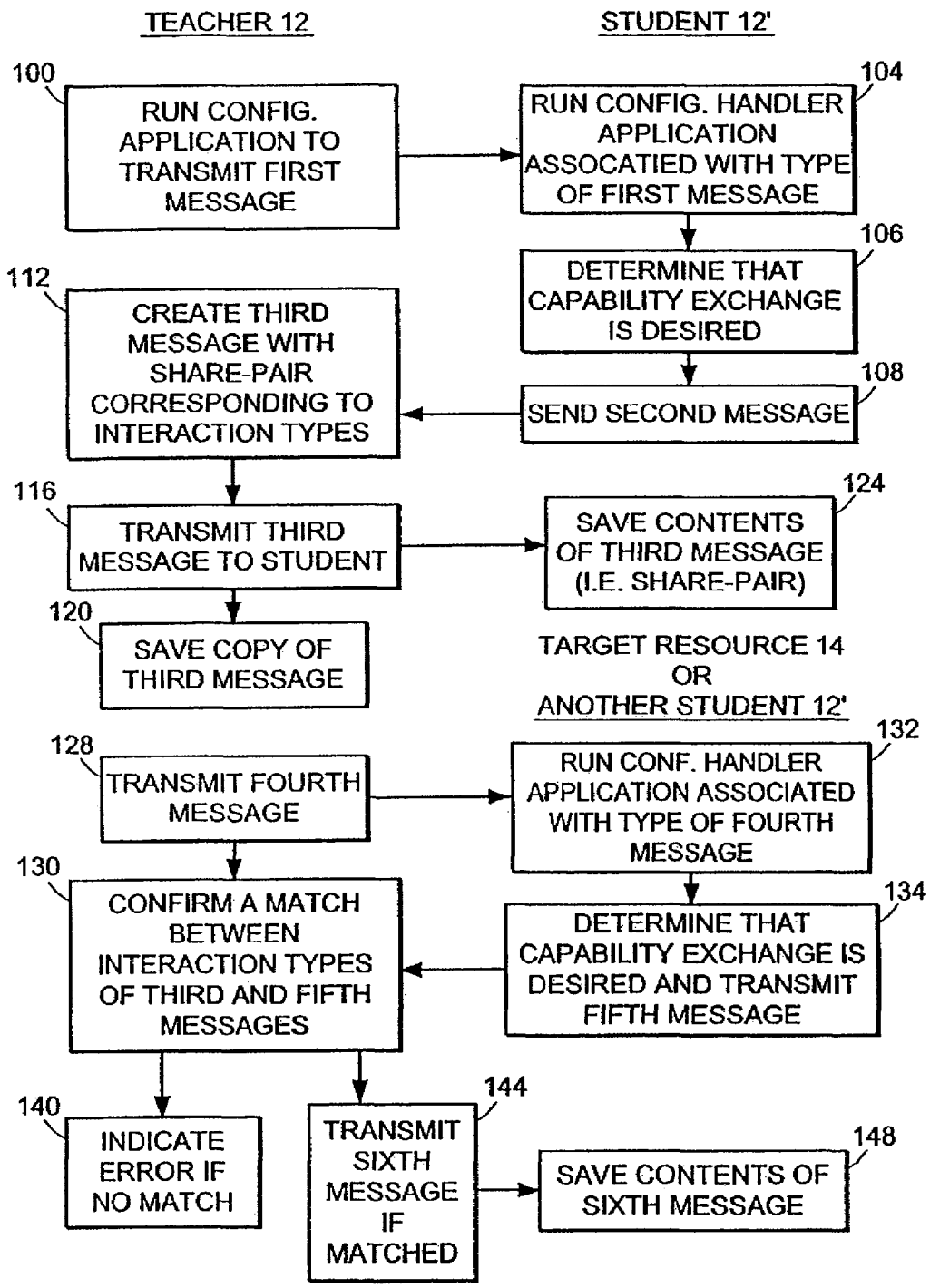
Figure 2A:
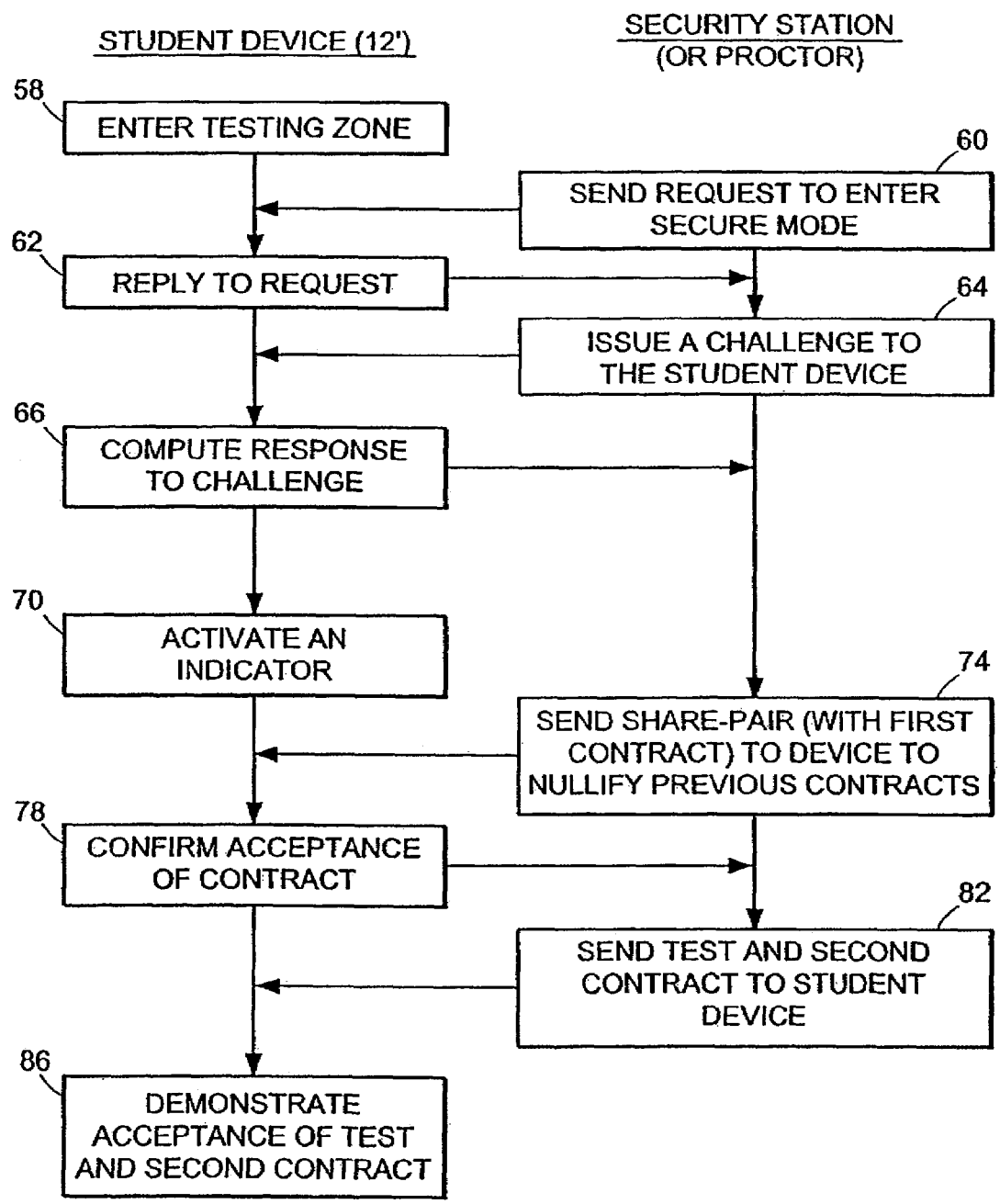
FIG. 2A is a flow diagram showing an embodiment of a process for operating a computing device in a secure mode for engaging in security-sensitive activities, such as administering and taking a test.

More specifically, FIG. 2A illustrates an embodiment of a process of placing and operating a computing device 12 in a secure mode for engaging in security-sensitive activities, such as administering a test to one or more students, in accordance with the principles of the invention. In this process, each student uses a student device 12', having the security manager 56, to take the test. (The security manager 56 can be transmitted to the student device 12' at the time of taking the test). The student device 12' has identifying label attached to it, marking the student device 12' as eligible for use during the test, or marking the device for use by a particular student during the test. Such a label makes it easy for the test proctor to detect that students have exchanged devices, or are using an ineligible device during the test. The student device 12' is connected to the network 2 by a wired or wireless physical link. Wired links can be peer to peer or over the network 2. For wireless links, the student device 12' can communicate with IR or RF signals.

Before the start of a test (or of an otherwise restricted class session), several security measures are taken to ensure the authenticity of the test taking process. As a first measure, each student taking the test enters (step 58) a secure examination area with his or her student device 12'. In one embodiment, the students necessarily pass near a security station in order to enter the examination area to sign in for the test. The security station can be, for example, a laptop computer, desktop computer, a portable computing device (e.g., a handheld), a wireless communication point, or an infrared beaming port controlled by a server system connected to the wired network 10. A person (i.e., the proctor) can monitor the security station to observe the class members to ensure they follow the security procedure.

When the student signs in for the test or passes near the security station, the proctor sends (step 60) a request to the student device 12' to enter a secure mode of operation. The student device 12' issues (step 62) a reply to this request, confirming that the student device 12' has entered the secure mode. In some embodiments, this confirmation includes one or more of a certificate of authenticity, a version number, and a certificate of integrity of the security manager 56 executing on the student device 12'. The confirmation can include characteristics of the student device 12', such as the make, model, operating system, resident applications, and databases of that student device 12'. Such checking of the hardware of the student device 12' operates another measure of security. Execution of the security manager 56 may, for example, detect the presence of a powerful algebraic solver that is not allowed during an algebra test.

The transmission of the request and reply can be by an IR beam, RF communication, or by wired communication. The face-to-face transmission of the share-pair and security program to the student provides another measure of security that authenticates the test taking process. Presumably, the teacher or proctor can identify the student by sight or by personal identification (i.e., student ID).

When properly in the secure mode of operation, the student device 12' is able to respond correctly to a challenge, such as the pressing of a particular key or keyboard combination or the receiving of a particular wired or wireless communication from the security station. In step 64, the student device 12' receives a challenge issued by the security station (or proctor) and computes (step 66) a response that demonstrates the authenticity and integrity of the student device 12'. Only those student devices 12' operating in the secure mode of operation can compute the correct response. Further, throughout the administration of the test, should the proctor detect IR and RF traffic from an unregistered (i.e., non-compliant) student device 12', the proctor can challenge that student device 12' to see if the student device 12' has the security manager in place. If not, the student device 12' is confiscated. In one embodiment, the security manager can lock out the repeating of traffic, and thus any detected traffic is an indicator of the presence of a non-compliant student device 12'.

In step 70, an indicator is activated on the student device 12' that verifiably shows that the student device 12' is operating in the secure mode of operation. In one embodiment, the indicator is a sticker that the proctor affixes to a visible surface of the student device 12' after receiving confirmation that the computing device is operating in the secure mode. The sticker can be chosen to be unique to the test event, and be hard to guess by class members before the event. In another embodiment, the indicator is a detectable output produced by the student device 12' upon entering the secure mode. For example, the indicator can be a visual display on the student device 12', such as a flashing LED (light-emitting diode), an emitted continuous or periodic sound, or a wireless transmission (IR or RF). In yet another embodiment, the indicator is that the student device 12' has the ability to respond to a challenge made by the proctor. Thus, the proctor can determine at a glance if any student was using a student device 12' that was not in the secure mode (e.g. from the absence of a flashing indicator), and could confiscate the student device 12'.

When operating in the secure mode, the security manager 56 implements the contract given to it, and this contract may lock out student use of certain features of their student device 12' during the test, such as locking out communication features. The request to enter the secure mode of operation includes information about which functionalities, modalities, or capabilities on the student device 12' are to be restricted or unrestricted. Accordingly, the security manager 56 uses the operating system of the student device 12' to impose one or more restricted capabilities, functionalities, and modalities. In some embodiments, the restricted capabilities include communicating over particular physical links (e.g., IR, RF, and wired links). Communications on these links can be filtered by IP address and socket. As examples of other restricted capabilities, the secure mode of operation can prohibit the student device 12' from communicating with a particular protocol (e.g., Bluetooth, 802.11, TCP/IP, OBEX, IrDA, HTTP, FTP) or with particular Internet hosts, which can be screened by protocol type, domain name or destination IP address. Other examples of restricted capabilities include prohibiting usage of particular kinds of system libraries on the student device 12' and usage of information transfer mechanisms such as copy and paste via a clipboard.

Examples of restricted functionalities include prohibiting the student device 12' from launching any application programs or particular application programs, from switching modes in an application, from storing any data or a particular type of data in memory (e.g., in a clipboard) of the device, and from reading any data or a particular type of data from memory. The operating system can use the application signature to filter the launching of application programs, and database type and record length, for example, to filter reads and writes of data. Other examples of restricted functionality include prohibiting the student device 12' from installing software on the student device 12', setting system preferences, and blocking the ability to use hardware add-ons. Restricted modalities can include prohibiting start-up after an interrupt, system re-boot, or reset of the device. In such types of events, a secure session persists across events.

Restrictions can be customized to specific student devices 12', depending on whether permission is given to have the use of the student device 12' monitored and stored for later analysis by the security manager 56. That is, a student can potentially be granted additional privileges in exchange for that student granting a right to log the private data of the student to an archive. For example, the student may request ability to read a database of notes during the exam, which the proctor can grant in exchange for a copy of the database, so that the database could be later reviewed for violation of the terms of the examination.

In some embodiments, the restrictions of capabilities, functionalities, or modalities are specified by rules. The rule language can match and filter content by a comparison operation and can specify multiple rules. These rules can be resolved by a metarule. The metarule can choose, for example, the most permissive or least permissive rule, or the most or least general rule.

Those restrictions applied to a specific application on the student device 12', in one embodiment, depend on whether that application can provide a certificate that enables the security manager 56 to confirm the origin and integrity of the application. In another embodiment, the restrictions applied to the specific application depend on a test that the security manager 56 makes of that application, such as testing its authenticity and integrity. In this embodiment, the request from the security station indicates those restrictions to be applied to the specific application if the application passes the test. The application-specific restrictions are communicated in a language agreed upon by the security system vendor and the application vendor, but are specific to the application, and particular to the capabilities of the application. Examples of application-specific restrictions include prohibiting classes of mathematical functions, such as trigonometric functions, computer-algebra-system operations and classes of textual functions, such as spell check, grammar check, dictionary access.

The rules specify the restrictions in a rule language that allows matching of general rules to specific situation. The general rules can match characteristics of an application, of data, of a communication link, of a communication protocol, of a system library, of an information transfer mechanism, of a host computer address, of a message sent to a host computer, or of information received from a host computer, of a buddy list (for a test where students work in teams).

Also, the security manager 56 can define different security levels for specific types of subject matter. For example, one security level can allow arithmetic, another the evaluation of algebraic functions, another the symbolic manipulation of algebraic functions, yet another the graphing of algebraic functions, and the like. Further, signed applets can be granted more permission than unsigned applets, and an applet is allowed to be signed (by a certifying authority) if the applet conforms to security manager guidelines (e.g. followed the subject matter security levels).

After the student device 12' is in the secure mode of operation, the security station beams (step 74) a specific contract (master) that nullifies (for a predefined period) all other contracts that are be present on the student device 12'. Consequently, the student device 12' is assured to have the proper contracts in force at the time of taking the test. Another measure of security is achieved by storing this contract in hardware of the student device 12' that cannot be tampered with by the student. The contract can reside in inaccessible hardware of the networking card (wireless 18 or wired 24) or be maintained in hardware of the student device 12' accessible only at the operating system level.

The contract also includes a unique encryption key that the student device 12' uses to communicate with the proctor. The encryption key can be a simple password or the public half of a public-private key encryption system. By this key, the security station (or proctor) determines (step 78) that the student device 12' accepted the contract because the key, which cannot be tampered with by the student because it is stored in the inaccessible hardware, is used when the student device 12' replies to the security station.

The security station beams (step 82) the test and a second specific contract having a contract and a unique key. As described above, the key passed with the contract shows (step 86) that the hardware of the computing device has accepted this contract. Also, the unique key links a particular completed test to a specific student device 12', thus preventing one student from submitting a completed test twice; once for himself, and again for a friend.

In one embodiment, the student device 12' participates in a security checkout procedure upon leaving the restricted area or restricted situation (i.e., test). This checkout procedure can involve a communication between the student device 12' and the security station (e.g., a log of student device 12' activity might be transmitted.)

Share Pairs Allow Teachers to Dynamically Control Communications

By creating share pairs and giving different contracts of a share pair to different devices, the teacher dynamically controls the interactions among computing devices 12 and resources 14 by moving about the classroom and interacting with the student devices 12' and resources 14 therein. The class of capabilities that the teacher can assign through the beaming of share-pairs provides a diverse range of interactive learning environment activity structures. For example, the teacher may want to define six groups of four students in the classroom for a group problem-solving activity. The teacher can flexibly define those groups in real-time by walking around the classroom and beaming a group-related share-pair to each student in a group. Then the teacher can beam to one student in each group a "leader" capability that enables that student to pass to the other students in the group specific capabilities, such as use of a probe for collecting data, the use of a display to show their work, and so on.

Share-pairs make tractable a problem that teachers may have in planning and performing a broad range of classroom interaction topologies. By distributing share-pairs throughout the classroom, the teacher enables and controls secure classroom communication, resource access, and document flow in a way that is easy for the teacher to specify and enact. Teachers can use peer-to-peer beaming (which is easily understood to designate particular computing devices 12) to shape the topology of shared medium (e.g., Ethernet or wireless) communications, wherein network addresses do not bear an obvious correspondence to physical entities).

In general, share-pairs are able to capture a wide range of classroom interaction patterns using a few primitive share-pair topologies. Specifically, four fundamental share-pairs, when combined in a plurality of configurations, allow a teacher to specify a broad range of classroom interaction patterns.

FIGS. 3A-3D illustrate these four fundamental share-pairs. In each of FIGS. 3A-3D, a box with a label denotes the share-pair, the block with a "T" denotes a transmitter of a message, and a block with an "R" denotes a receiver of the message. The message is any electronic communication, which can include attached data, electronic files, etc.

FIG. 3A shows a "messaging" configuration for share-pair 150. For this share-pair configuration, the share pair 150 has two contracts. One contract, given to the transmitter 152, grants a transmit capability but no receive capability. The other contract, given to the receiver 154, grants a receive capability but no transmit capability. Both contracts have the same identifier. The contract layer 38 on the transmitter 152 evaluates the transmitter contract 1) to accept any message having the contract identifier received from an upper protocol layer, for forwarding to the communication medium, and 2) to reject any message having the contract identifier received from a lower protocol layer. Conversely, the contract layer 38 on the receiver 154 evaluates the receiver contract 1) to reject any message having the contract identifier received from an upper protocol layer, and 2) to accept any message having the identifier received from a lower protocol layer, for forwarding to a higher protocol layer.

During operation, the transmitter "T" 152 sends a message over the network 2. The message includes the identifier associated with the contract given to the transmitter 152. The receiver "R" 154 receives the message over the network 2, uses the identifier to access the contract given to the receiver 154 (stored in memory 26), evaluates the contract, and processes the message, provided the terms of the receiver's contract so allow.

In another embodiment, the same "full" contract, including both those terms that apply to the transmitter 152 and those terms that apply to the receiver 154, is given to both the transmitter 152 and the receiver 154. In this embodiment, each device is given a means of distinguishing which terms apply to that device. In yet another embodiment, one device (e.g., the transmitter 152) has the full contract, with the means of distinguishing the applicable contract terms for that device, and the other device (e.g., the receiver 154) has the contract with only those terms applicable to that device (i.e., the receiver contract).

FIG. 3B shows a "distributing" configuration for share-pair 158. For this share-pair configuration, the share pair 158 has contracts like those used in the "messaging" configuration, however the teacher grants the "T" contract to only one computing device and the "R" contract to a plurality of computing devices. Each granted contract has the same identifier. The transmitter "T" 156 sends a message over the network 2 (e.g., by point-to-point IR beaming or RF broadcasting). The message includes the identifier associated with the transmitter's contract. A plurality of receivers 160, 160', 160" (generally 160), each denoted by "R", receives the message over the network 2. Each receiver 160 then uses the identifier to access the contract given to that receiver 160, evaluates the contract, and processes the message, provided the terms of the receiver's contract so allow. Typical uses of a distributing configuration share-pair are for sending the same object to all students (such as a homework assignment), sending different, unique objects to each student (e.g., individualized tests), and sending parts of objects to students (such as sending out one part of a class project that is to be assembled by the whole class).

FIG. 3C shows a "collecting" configuration share-pair 164. For this share-pair configuration, the share pair 164 has contracts like those used in the "messaging" configuration. In this case, the "R" contract is granted to only one computing device, and the "T" contract to many computing devices. Each granted contract has the same identifier. A plurality of transmitters 162, 162', 162" (generally 162), each denoted as "T", sends a message over the network 2. The message has the identifier associated with the transmitter's contract. A receiver "R" 166 receives the message over the network 2, uses the identifier to access the contract given to the receiver 166, evaluates the contract, and processes the message, provided the terms of the receiver's contract so allow. A typical use of this configuration is for the student (here using transmitter 162) to hand in an assignment to the teacher (here using receiver 166). Examples of collecting include collecting a specific object from each student (such as a homework assignment or test), adding by each student to a larger structure (synchronizing a group or class presentation), and tabulating a set of individual responses (such as voting).

FIG. 3D shows a "sharing" share-pair configuration. In this configuration, the share pair 168 contains only one contract, and the contract grants both transmit and receive capabilities. Every device 12 gets the same contract. In this configuration, each configured device 12 transmits and receives all data intended for this share-pair 168. A typical use of this configuration is for students who are working together on a project to share their findings with the other students in their group (i.e., having the same contract). Examples of sharing include those described for the distributing and collecting configurations.

Figure 4:
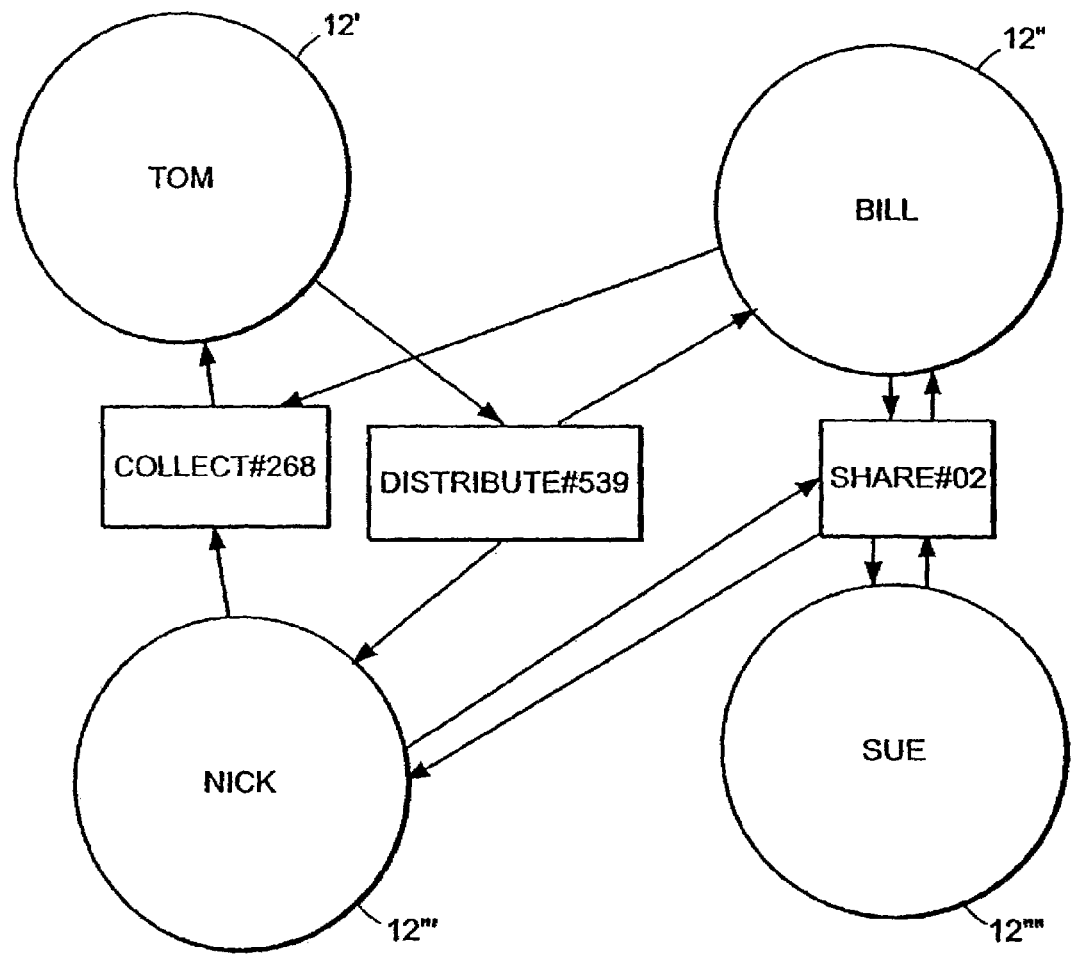
FIG. 4 is a diagram illustrating exemplary capabilities given to computing devices through the distribution of at least one of the share-pair configurations shown in FIGS. 3A-3D.

FIG. 4 shows an embodiment of a classroom communication topology that has four students named Tom, Bill, Nick, and Sue. The computing devices 12' of these students are configured with three share-pairs as follows. Tom has two contracts labeled "collect #268" and "distribute #539; Nick and Bill each have three contracts labeled "collect #268", "distribute #539", and "share #02, and Sue has one contract labeled "share #02".

The contract labeled "collect #268" enables Tom to collect messages from Nick and Bill, the contract labeled "distribute #539" enables Tom to distribute messages to Nick and Bill, and the contract labeled "share #02" enables Sue, Nick, and Bill to send and receive messages to and from each other. In this exemplary classroom, it may appear that all students (Tom, Bill, Nick, and Sue) can share all messages with each other because Tom can distribute a message to Bill (per contract distribute #539), and Bill can share with Sue (per contract share #02). However, Sue does not possess the contract named distribute #539, so Sue cannot process any message distributed by Tom with the distribute #539 contract. (Note, the message from Tom to Bill includes the distribute #539 label, and Sue lacks the appropriate contract, and thus a contract, that would enable Sue to process the message when the message is received.) In this way, a teacher can specify a set of configurations that allows some documents to be shared by the class (using a "share" contract that includes all class members), whereas other documents may be distributed to specific class (or group) members (by specifying the appropriate contracts).

In general, when a computing device 12 transmits a communication, that communication is associated with a particular contract by an identifier (or label). The communication is received at the contract layer 38 from a higher protocol layer in the protocol stack 30. At the contract layer 38, the computing device 12 determines whether to present the communication to the communication medium based on at least one term of the contract associated with the identifier. Upon determining to present the communication to the communication medium, the identifier is incorporated in the communication before the communication is forwarded to a lower protocol layer (e.g., the multicast packet hop (or hip hop) layer 50) in the protocol stack 30 for placement on the network communication medium.

When a computing device 12 receives a communication, the lower layers of the protocol stack 30 initially handle that communication. An identifier accompanies the communication; this identifier is associated with a particular contract. The communication passes to the filtering layer 54, which extracts the identifier from the communication and determines whether to present the communication to a higher layer (e.g., the content routing layer 40) in the protocol stack 30 based on at least one term of the contract.

A Classroom Modeling Language (CML)

In a typical classroom, the teacher and students using their computing devices 12 participate in a variety of interactive activities. A classroom modeling language (CML) provides a method for systematically describing, from a teacher or activity designer's perspective, the various patterns of classroom interactions that are planned for particular classroom activities. The CML specifies an underlying architecture, upon which a graphical or procedural language can be built, that accommodates the specification of a complex set of overlapping share-pairs. In general, the CML provides a means by which the teacher can author and distribute contracts of the appropriate type to implement a desired workflow pattern. Such software for authoring and distributing contracts reside on the teacher device 12 and function at the application layer 44. Student devices 12' can also have CML-based applications operating at the application layer 44. For example, the student devices 12' can have a CML-application that responds to messages from the teacher, instructing the students to activate and deactivate particular activities, thus changing the pattern of activated contracts and content routing choices.

The CML supports three types of actors: persons, group managers, and bots. (Every actor in the network is a case of one of these actors.) A person is an individual using one computing device 12. A group manager is the hub of an interacting group of actors. In one embodiment, groups of actors are specified by share-pairs. A bot is a computer agent, and in one embodiment can be described by the Open Agent Architecture. Each actor has descriptors (metadata), data, and one or more transient states associated with that actor. Table 1, below provides a description of each of the properties of each type of actor.

TABLE 1

CML Actors
Properties of CML Actors

| Actor | Descriptors | Data | Transient states |
|---|---|---|---|
| All Actors | ID, repository address | List of associated data objects | Transfer Queue, Linkage |
| Person | gender, class rank, | List of group affiliations | Activity |

TABLE 1-continued

CML Actors
Properties of CML Actors

| Actor | Descriptors | Data | Transient states |
|---|---|---|---|
| | learning type, etc... | as ordered progress pairs: (group ID (as specified by the share-pairs they are in), role(s) played in group), Goals | progress |
| Group Manager | Topology, Purpose/type | List of members as ordered pairs: (actor, role), List of group affiliations as ordered pairs: (group ID, role(s) played in group), Goals | Activity progress |
| Bot | Description of capabilities (OAA style) | Schedule | Current task |

Each actor has an ID. An "ID" can include several parts, including a real world name, a unique system ID, and an email address. Also, a storage address is associated with each actor. This address is not a literal machine address, but rather an identifier that allows data and the metadata describing the actor to be recorded or retrieved to and from the appropriate location. In one embodiment, the identifier is a Uniform Resource Name, or URN. The address can be associated with multiple machine addresses. For instance, a student's data can be saved on the student device 12', and queued for transfer to a central server machine each time the student "saves" a data object.

Each actor has a list of data objects associated (i.e., viewed, controlled, or owned) with that actor. In one embodiment, one data object is an XML document containing the actor's descriptors.

Each actor includes two transient states—a Transfer Queue state and a Linkage state. The Transfer Queue state is a list of data objects currently scheduled for transfer between this actor and another actor. Linkage state is a list of all links to or from the actor, where to be "linked" effectively means to be "logged in." For example, if a student turns on his student device 12' in the presence of the classroom network 2, the student automatically logs in (is linked to) the group "Class." Consequently, that student's linkage list has a link to the Class. Note the "Class" itself is a special case of a group— all students are members with the role of "Student," and the teacher is a member with the role of "Teacher."

One type of actor is a person. "Person" refers to not just to the human being, but also to the computing device 12 that the human being is currently using to interact with the network 2. Thus, the ID of a person can be a combination of the person's name and an identifier associated with the person's device 12. In general, the repository address for the person is the computing device 12, but that does not have to be the case. In addition, a person has other descriptors used for grouping purposes, such as gender, class rank, and learning type.

Generally, a person is a student or a teacher. A teacher is a special case of a person, in effect, a "superuser" of the network 2, who can link directly to any actor and edit or create group affiliations for any actor. In one embodiment, the teacher achieves the linking, editing, and creating by creating share-pairs for each student.

Each person is associated with data objects and with a list of groups. In one embodiment, this list of groups corresponds to a list of share-pairs that the person belongs to. This list of groups also includes the person's role or roles in that group. A person can also have a list of goals that describe what the person is ultimately working toward in the current activity. Also, a transient value ("activity progress") is a measure of the person's performance on the current activity.

A group manager is an actor that keeps tracks of a group and manages the group's resources. A group is two or more persons or groups that can become linked via a network topology, described below. In one embodiment, the group manager stores information about each share-pair distributed to the students and resources.

The group manager is not associated with a particular computing device—one device 12 or a set of devices 12 can operate as a repository for a group. The group manager is associated with an interaction topology and, optionally, a defined purpose or type for the group.

The group manager maintains a list of the actors that can link to the group manager and the role(s) that each actor plays. The group manager also has a list of groups that the group manager can link to, and the roles that the group (subgroup) plays in those groups (supergroups). The group manager can have information describing the goals of the group. Like a person, a group manager can have a transient value representing the group's present state of progress on the task at hand.

A bot is an independently operating agent (e.g., process) in the network 2. In addition to having an ID and a repository, a bot also has a set of descriptors that describe the bot's capabilities. Each bot is associated with a schedule that indicates what operations the bot performs and when the bot performs them. Each bot can have a transient state representing its current activity, and another transient state measuring the bot's progress on that activity.

The actors in the network 2 interact with each other through data objects. Data objects exist in the distributed network 2 and can be shared by multiple actors. Each data object has the following properties: 1) an identifier, 2) ownership, 3) semantic type, 4) a list of parent and child IDs, 5) a modification history, 6) a list of views and controllers, and 7) permissions.

The combination of a data object's ID and its physical storage location enable the distributed network 2 to locate the data object. In one embodiment, the storage location is specified as an URN.

Actors can own data objects. Although many actors can view or control access to a data object, only the owner may delete the object or set the data object's permissions.

The semantic type of a data object is, for example, the data object's class (in Java terminology). A given semantic type has certain capabilities (public methods) and certain data values (fields and accessors) contained within it. These capabilities determine what kinds of views and controls can be created in relation to the data object.

From the view of a given data object, the given data object can reference other data objects as part of the given data object's data, and these referenced data objects are the given data object's children. Other data objects can reference the given data object as part of their data. These data objects are the given data object's parents. So, each data object contains a list of its children, to be able to access that data object's data when needed, and a list of its parents so that a parent can be notified if one of its children has been modified.

Each data object maintains a modification history, as either a list of ordered pairs: (modification date, modifier), or as a complete underlying CVS-style (Concurrent Version Style) system, described below.

Each data object can maintain a list of currently opened views and controllers, in the event that it needs to notify the views and controllers of changes to the model.

Each data object maintains a list of individual people with "v," "c," and/or "t" (view, control, and/or transfer) access, and the specific access for each person. For example:

| [000142] | Student A | --t |
| [000143] | Student B | vct |
| [000144] | Student C | vc- |

Each data object also maintains a list of groups with view (v) or control (c) access, and the access for each group. For example:

| [000146] | Group A | vct |
| [000147] | Group B | vc- |
| [000148] | Group C | v-t |

In the above examples, a dash ("-") rather than a "v", "c", or "t" indicates that the person or group does not have the permission.

Typically, groups share data objects. In one embodiment, the distribution of share-pairs to students forms these groups. For data objects shared by a group, the CML resides on the group's repository, and any member in the group can request a view of it. There are four embodiments for controlling access to shared data objects: 1) synchronized access, 2) database-style, 3) CVS-style, and 4) distributed access.

For synchronized access to a shared data object, only one actor can initiate a control session on this data object at a time. Other actors desiring to access the data object wait in a queue.

For database-style access, only one actor can initiate a control session on a particular part of the data object at a time. The granularity of a "part" is determined by the logical structure of the data object under consideration. For example, in a database a "part" is typically a record, for a presentation a "part" can be a slide, for a word processing document a "part" can be a paragraph or a section. All group members can view all parts of the data object at once, but only one member can control a particular part.

For a CVS-style (Concurrent Versions System) access, any member of the group can open a control session with the data object at any time. When each member is done with the data object, each member submits its new version of the data object for saving in the group repository. The CVS attempts to merge each new version of the data object with the present data object in the repository. In one embodiment, the CVS maintains a history of changes made to a data object.

For distributed access to a shared data object, all views of the data object, including views in controllers, are real-time. When any actor makes a change to the object with a controller, the model on the service is modified and the changes propagate out to all open views.

In a distributed-network environment, such as the MANET 6, all group members are not always located together in space and time. Therefore, to maintain distributed access, control privileges exist only when all group members are part of the network 2. Alternatively, the access control technique resorts to a CVS-style implementation, in which changes that were made are automatically noted and manually or automatically integrated into the data object.

For synchronized, database-style, and CVS-style accesses, a change to the model when views are open can be handled by: 1) relying on the student or teacher to determine if their view is current, 2) sending a message to every view in the data object's list, 3) periodically checking the viewer application to see if the model has changed, and if so, downloading the new version, or 4) scheduling a transfer of an updated version of the view.

Transfer queues handle the movement of data objects between actors. Each transfer queue is a list of transfers. Each transfer includes the following properties: 1) pointers (e.g., URNs) to the destination and origin of the data object being transferred, 2) a bit indicating the direction of movement (send or receive), 3) the current fractional completion of the transfer, 4) a bit indicating whether the transfer is a copy or a move, and 5) a bit indicating the transfer is destined to be a "mass mail" to the members of a group.

There are two general kinds of transfer—download and exchange. "Download" is akin to putting a data object in a public FTP (file transfer protocol) folder and letting others know that the data object is available. "Exchange" is similar to emailing a file.

A download is the case where a data object is made available to some group for transfer. (The transfer permission has been set for the group.) In one embodiment, an actor knows or can derive the URN of the data object in order to download it.

An exchange involves active participation of an actor with the data object and actor who is to obtain the object. One actor initiates the exchange by sending a message to the other actor, requesting to send or to receive the data object (for which the recipient of the message does not yet have transfer access.) If the other actor agrees to the exchange, then a transfer is added to each actor's queue. Once a transfer is queued, the file system of the network 2 completes the transfer.

Messages are transient data objects that are stored locally until transferred, at which point the messages are deleted. Messages are a special semantic type of data object. The sender of a message does not have to wait for a recipient to accept it, as in the case of an ordinary exchange. The message is automatically transferred to the target. Some embodiments include various features with a message such as logging, receipt requests, dialogs, etc.

Actors can be members of various groups, but they do not interact (i.e., perform transfers) with those groups until the actors become linked to the members of the group or to a group's group manager. To begin group interaction, an actor opens a link to the group manager. What happens next depends on the topology of the group's network. Regardless of network topology, the actor can send a data object to every member of the group in one transaction (mass mailing.) Once linked to the group manager, the actor can request data from the group manager, such as the member roster of the group and the present linkage.

If group members cooperate via a client/server network, the group manager acts as "server" for the group. Recall that the group manager is associated with a repository. This repository serves as the shared "file space" for the group. Here, group members can post data that they want other members to download. Also, any data objects that are shared by the group reside in this repository.

If an actor in a client/server group wants to send a data object to the entire group (mass mail), the following happens:

1) Actor A schedules a data object for transfer to group actor G, with the "mass mail" bit set.

2) The data object is transferred to the group repository.

3) Actor G schedules transfers to each other member of the group;

4) The data object is copied from the repository to each actor in Actor G's linkage, except to Actor A. The data object can be deleted from the repository.

If the network topology of the group is point-to-point (P2P), then logging in to the group manager results in a link being created to each other member of the group. There is no "server" in this case. If a file is to be shared, a group member hosts the file on his or her own computing device 12. In effect, there is no single group manager for group arranged in a P2P network topology—the group manager is distributed among the group members. In one embodiment, a copy of the group manager resides on every computing device 12 in the group. In another embodiment, the group manager resides on a subset of computing devices (for instance, on the computing device of the person who is the designated "group leader").

A distributed group manager synchronizes itself. For example, when an actor logs in to the group, the group manager on that actor's computing device 12 searches and finds other group managers in the P2P network. That actor's group manager then sets its own state to the state of those other group managers.

For a group in a P2P network, the following occurs when a data object is transferred from an actor to the group:

An actor A schedules a data object for transfer to group manager actor G;

Group manager G schedules each transfer in actor A's transfer queue to each actor in Group manager G's linkage other than actor A;

The data object is copied (or moved) to the repository of each target actor.

Embodiments of P2P networks include networks that are limited, directed, or both. In a limited P2P network, a given actor links to a subset of the group (the limit is that the given actor does not link to the other members of the group). In a directed P2P network, a given actor can transfer in one direction to another actor in the group (this network is directional in that the other actor does not transfer to the given actor). An example of a group that is limited and directional is a "chain." A chain is, in one embodiment, a linked list of actors, in which a given actor can receive data objects from only the actor immediately "upstream" in the list, and can send data objects to only the actor immediately "downstream" in the list.

Actors participate in activities. An activity is the interaction amongst actors and data objects that is directed towards achieving one or more goals. Hence, to define an activity, a teacher or author defines an objective or goal, identifies who is to work on the activity to achieve the goal, and what the "input" data objects are to be. In some embodiments, the goal amounts to the creation of one or more "output" data objects. One example of a goal is to open a view to the input data objects.

Activities can be chained or networked together to form a superactivity. This superactivity can be part of another chain or network of activities, which in turn is part of a yet another, higher-level activity. Subactivities are referred to as being nested within their superactivity.

To chain activities, a linked list of activities is created. In one embodiment, the input data objects that are inputted to a given activity in a chain are the output data objects of the activity that linked to the given activity.

Creating a network of activities is similar to creating a chain of activities, except that in the activity network there can be more than one link from the current activity to the "next" activity. At each branching point in the activity network, in one embodiment the student can choose the next activity. In another embodiment, the next activity depends upon the output data object from the current activity. Whether activities are chained or networked, a linked collection of activities is a directed graph.

When a linked collection of activities is created, that linked collection becomes encapsulated in one superactivity. The "goal" of the superactivity is to complete all of the goals of the subactivities. The input data objects of the superactivity are the input objects of the first activity in the linked collection and the output data object of the superactivity is the output data object of the last activity in the linked collection.

As described above, the teacher is the superuser of the network 2. As the superuser, the teacher can, among other things, create groups. To define a group, the teacher creates a group manager for the group. This has two steps, assigning descriptors for the group manager, and assigning the group manager initial data.

Creating any actor in the network 2 begins by assigning values to the descriptors of the actor. An ID is created, then a network topology is chosen—Client/Server or P2P. If the group is a Client/Server network, then a repository address on the network 2 is defined for the group manager. The teacher can create a general description of the group—for example, "National Government," "Research Team," etc.

The teacher also associates the group manager with data. There are three types of data associated with the group manager: 1) data objects; 2) a member roster; and 3) group affiliations. The teacher creates a list of URNs of the data objects that the group has at the start. Then the teacher creates a list of students that are a member of the group, and assigns each student one or more roles. If the group is to be a member of a larger group, the teacher identifies that group and assigns the subgroup's role in the supergroup.

The teacher then clicks an "Enable" button, for example, to enable the group manager. How the CML system activates the group manager depends on the network topology of the group. For client/server networks, the CML system creates the repository for the group manager, and moves a copy of all the data objects assigned to the group, and an XML document containing the group's descriptors and membership, to this repository. Then a bot is scheduled to search the network 2 and to find each student in the group, and to add the group and the role of the group members in the group to the student's group membership list.

For P2P networks, a P2P group has no centralized repository. Here, the bot moves a copy of the data describing the group manager to each member of the group. The bot also puts at least one copy of each of the data objects assigned to the group to at least one of the group's member's repositories.

When the teacher places a student in a group, the student receives a notification. In one embodiment, the student's own group membership list sends a message to the student when the list is altered. In another embodiment, the bot that modifies the group membership list puts a message in the student mailbox.

Upon placing a student in a group, the teacher can find out the status of each student with respect to the current group of that student. For instance, the teacher can determine: 1) if all students were assigned to a group, 2) which students, if any, did not receive their group notification, and 3) what groups are missing students from the classroom today. To determine if all students were assigned to a group or which students did not need a notification, the CML system specifies that a return receipt be sent back after the students receive notification that they have been placed in a group. To determine which groups are missing students, the teacher can query the network 2 to discover each student's status.

In a distributed MANET, a negative response (i.e., no return receipt) from a student is not a definitive answer that the student has not received the notification because the student can receive such notification outside of the classroom. For example, if it appears that one Student S did not receive a group notification, this can be because Student S received the notification from another Student Y on the school bus, and neither Student S nor Student Y are currently in the teacher's MANET. Also, in a distributed MANET, a negative response to the teacher's query to determine who is missing in the classroom is not definitive because the student device 12' of the student may be turned off, and thus unable to respond to the query.

In each of these cases, although the teacher obtains ambiguous results (that is, a negative response does not necessarily mean that the actual answer to the query is negative), the answer received can be satisfactory because of the nature of the classroom. The teacher can then (a) resend the communication to everyone who has answered in the negative, or (b) contact the appropriate students through other means (such as a face to face discussion) to find out the actual status of the student. In this way the CML system, although not providing unambiguous answers to all possible queries, can provide the teacher with the information needed to act appropriately in the classroom. Similar matters hold for the delivery and receipt of data documents.

To participate in a group, a student opens a link to the group manager. This can require a login with a password, and the first time the student logs in, the student may have to create a new password. After linking to the group manager, the student can find out about the group and the role of the student in the group. The student can also determine who are the other members of the group and whether these members are logged in, what are the data objects of the group, and what is the goal or role of the group. If the group is to be a P2P group, the student is also linked to the other members of the group.

A primary interaction mode between members of a group is communication. Message data objects mediate communication over the network 2. At one level, the network 2 uses an email type system, an instant messenger system, or both systems to implement the communication. Other message types include exchange requests and responses, automated messages such as "You've been added to Group X, whose group manager may be found here" or "A document from your teacher is waiting for you here." An example of a useful message type is a "dialog," in which the sender of the message requires a reply. In one embodiment, a dialog is a yes-or-no survey to a request that a particular semantic type of data object be returned.

A teacher can define an activity as having a certain class of input data object, a certain kind of actor, and, optionally, a certain class of output data objects. The assignment of specific values to the data objects occurs when the activity is instantiated (during run-time operation of the CML system in the network 2). In one embodiment, each activity is defined as having an input data object, a participant actor, and a goal.

Creating an activity involves identifying each of these items. Specifically, a class of data object and a type of actor (a person, or a group of a particular type defined in its descriptor) are defined, and the goal is textually stated, defined as being a data object of a particular class, or both.

Creating a superactivity (i.e., an activity that is composed of a linked collection of activities) also involves identifying the same descriptors as an activity—the input data object, actor, and output data object. As described above, the input data object is the input of the first subactivity, and the output data object is the output of the last subactivity. For a superactivity, the actor is a group if the subactivities are to be performed by multiple actors, otherwise, the actor is just one actor that performs all of the activities.

The group associated with the superactivity has each of these actors as members. Accordingly, participants in a lesson can send and receive data objects to and from the actor next and previous (in a linked list) to them in the network 2. For example, the group is created as a limited and directional point-to-point network whose topology reflects the topology of the activity network.

Besides identifying the group associated with the superactivity, the teacher (or author) identifies the collection of activities and the link topology among the members of the group. The teacher also identifies which member of the superactivity group is to do which activities.

The set of participant actors in an activity can be defined as an activity (or interaction) topology with bounded repeats (including properly-nested substructures).

Figure 5A:
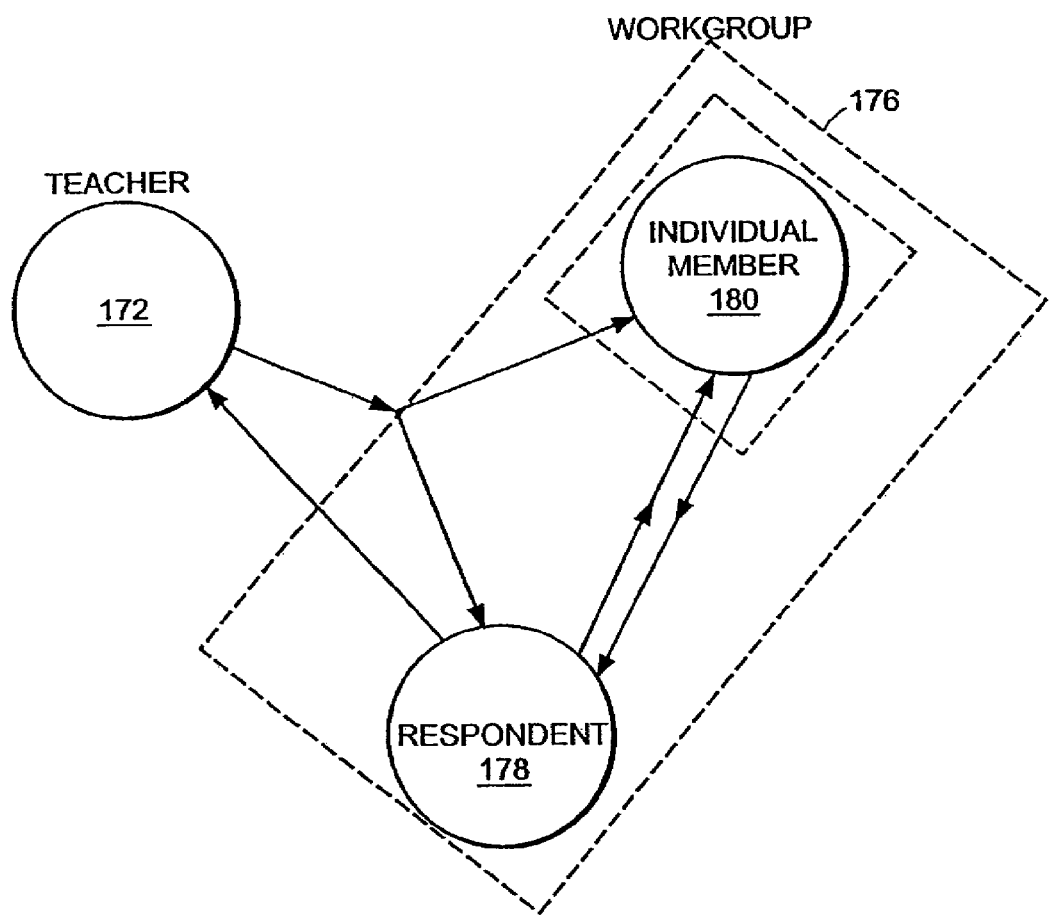
FIGS. 5A-5C are conceptual diagrams illustrating a grammar that can describe different classroom activities and topologies.
Figure 5B:
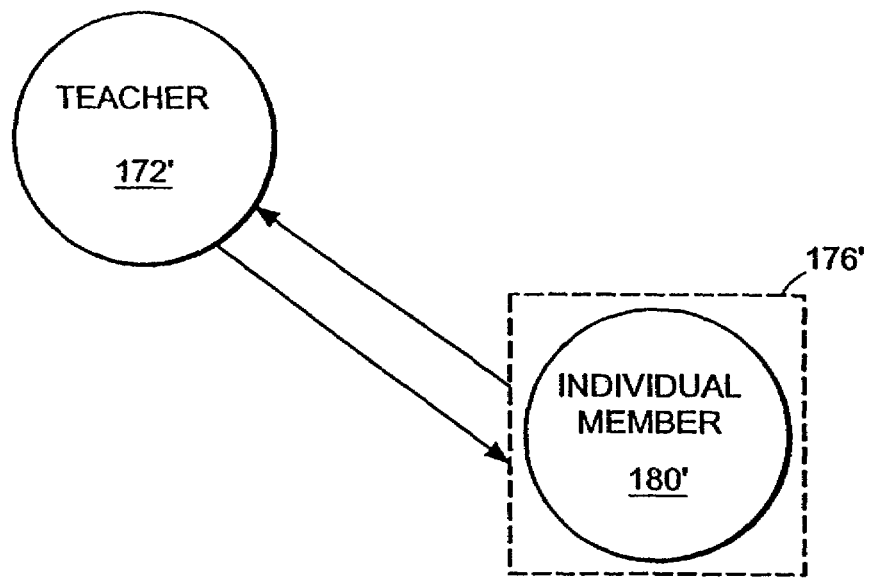
Figure 5C:
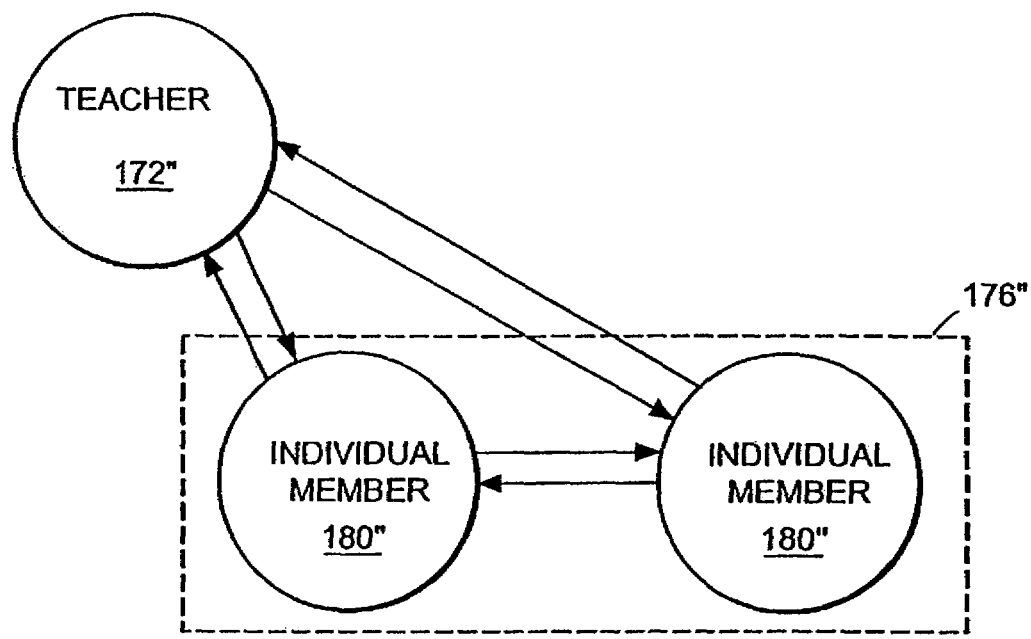
Figure 6:
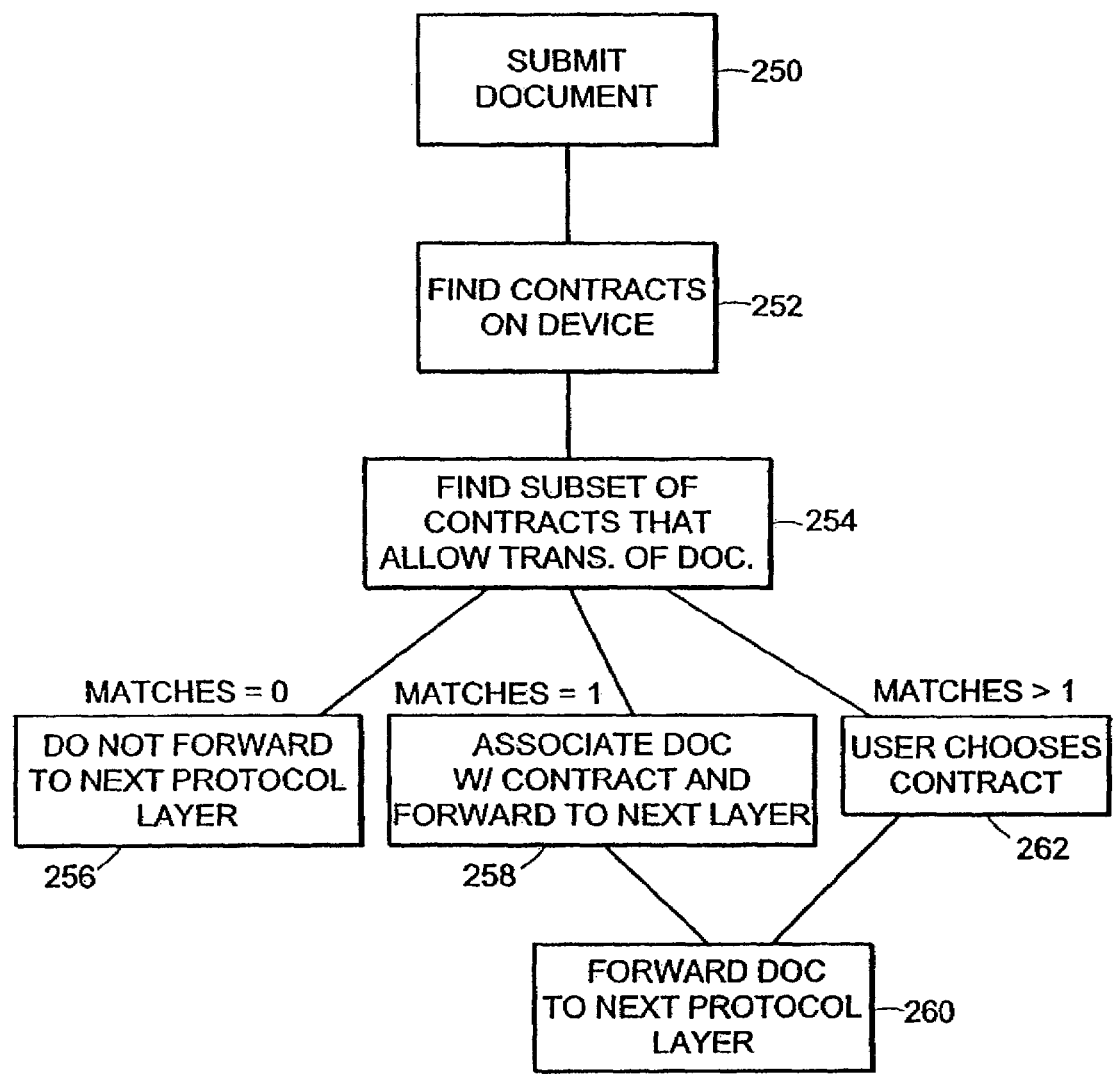
FIG. 6 is a flow diagram of a process by which the binding of metadata-based data to share-pairs controls document flow through the network.

FIGS. 5A-5C illustrate an example of a grammar that can be used to describe different classroom and activity topologies. Dotted boxes specify that any item in the box can be repeated. In FIG. 5A is shown an example of an activity topology for a given class activity. In this class activity topology there is one teacher 172, who is linked to one or more groups 176. Each group 176 has one respondent 178 and one or more individual members 180. This grammar shows that this class activity has one or more groups by having the group appear as a dashed-line box, and that each workgroup 176 has exactly one respondent 178 and one or more individual members 180 by having the individual member 180 appear, and not the respondent 178, in another dashed-line box.

This grammar generalizes to any activity topology. For example, FIG. 5B shows an activity topology for a classroom activity in which each student (individual member 180') is to work alone. In FIG. 5B, the teacher 172' is linked to one or more groups 176' having only one individual member 180' (the dashed-line box around the individual member 180' signifies that there can be more than one group 176' and that each individual member 180' is a group of one). FIG. 5C shows a classroom activity in which students 180" are to work in groups 176" of two. As shown, each group 176" has exactly two students 180" who can communicate with each other and with the teacher 172".

Content-Based Routing

In the cases described above, the student explicitly chooses a contract to associate with a document for transmissions. In some cases, it is desirable for this step to occur automatically. This automation may be accomplished by submitting a document (and descriptors of the document, if any) to a content-based routing layer 40 described above. This layer 40 chooses a contract for the document as follows.

At step 250, a document is submitted to the content routing subsystem 40. The subsystem finds (step 252) all contracts on the device 12 and then finds (step 254) the subset of these contracts that would allow the document to be transmitted. Each contract in this subset is a match. If there are no matches (step 256), the document is not forwarded to the next layer in the protocol stack (i.e., the contract layer 38). If there is only one match (step 258), that contract is associated with the document and passed to the contract layer 38 for transmission (step 260). If there is more than one match (step 262), the user is presented with a choice among the matches. The selected contract becomes associated with the document.

Data Migration

The network 2 employs a distributed transparent caching subsystem at the data migration protocol layer 54 of each computing device 12 for storing data on the MANET 6. In general, the distributed transparent cache provides a mechanism for fine-grained, opportunistic data synchronization along the share pairs by ranking incoming and newly produced data as to their relevance to a particular share pair and importance to an individual (student or teacher).

Figure 7A:
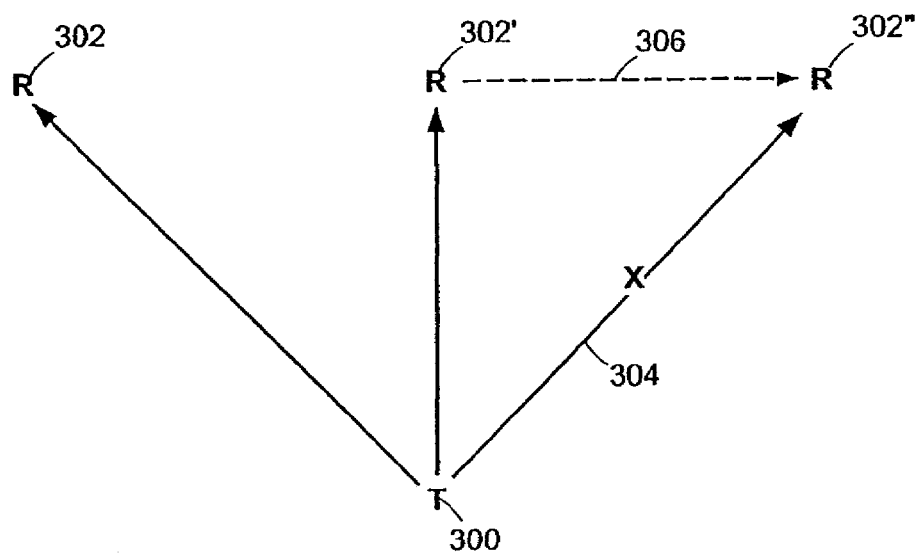
FIGS. 7A-7B are diagrams of an embodiment of document forwarding performed by computing devices in the network.

FIG. 7A shows one embodiment of this distributed transparent caching subsystem. If the transmitter T 300 sends a communication (hereafter message) over the network 2, this message can be received by a plurality of receivers R 302, 302'. Not every receiver (e.g., receiver 302') may receive this message initially (due to distance factors, such as being out of range, time factors such as the device 12 not being turned on at that time or not being present that day, etc.). The line 304 from T to R marked with an "X" indicates this undelivered message. In accordance with the principles of the invention, one of the other receivers 302, 302' can relay the message to allow all potential receivers to receive the communication. Accordingly, if the receiver 302" has a contract that is associated with the message, but was unable to receive the message when initially transmitted by the transmitter 300, other receivers 302, 302' can forward that message when the receiver 302" becomes able to receive the message (e.g., the student using receiver 302" turns on the student device 12' or comes into range of the MANET 6). Note that the receiver 302" does not need to receive the message within the environment in which the transmitter 300 originally sent the message (e.g., the classroom). The receiver 302" can receive the message from receiver 302' any time the two student devices 12' engage in communication, such as when both students are together riding a school bus.

Figure 7B:
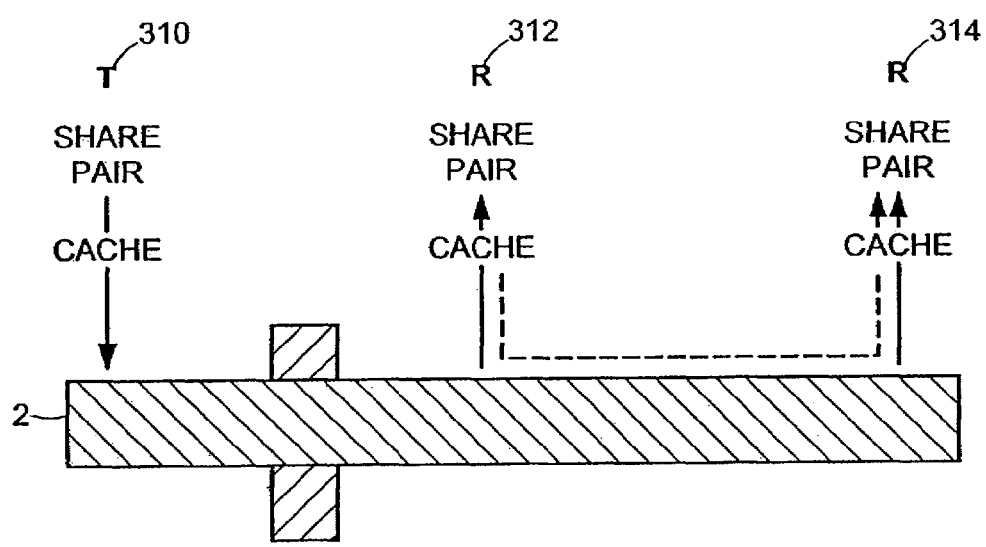

Further, receivers (i.e., devices 12) that do not have the appropriate contracts to explicitly send a message can still forward the message. For example, as shown in FIG. 7B, the transmitter T 310 can send a message (associated with a particular share-pair) over the network 2 that is received by a first receiver R 312, but not by a second receiver R 314. The first receiver R 312 stores the message in cache. In one embodiment, the receiver R 312 does not need to have a contract for this particular share-pair in order to cache this share-pair communication. That is, if there is memory available in the cache of the receiver 302', and if the message is deemed to have sufficiently high priority, the cache can accept the communication for the purpose of allowing devices 12 that do have the appropriate share-pair contract to query for the communication.

Consider that these receivers R 312, R 314 do not have privileges (i.e., per the share-pair contract) to send a message associated with this particular share-pair. Should the receivers R 312, R 314 subsequently become part of a MANET that is inaccessible by the transmitter T 310, the cache of receiver R 314 can query the cache of receiver R 312 to see if any messages were sent that are associated with the particular share-pair. (This presumes that the receiver R 314 is interested in this particular share-pair). The cache of the receiver R 312 answers the query in the affirmative and sends the message to the cache of receiver R 314. The receiver R 314 then forwards the message to the appropriate application data-delivery system. Because the student who is using the receiver R 312 does not explicitly attempt to send this message, this transmission does not violate the share-pair contract.

Cache management of share-pair communications is a composite measure 1) of relevance to a device (the recipient of the communication) and 2) of relevance to other classroom participants, particularly participants in the same share-pair. In one embodiment, relevance to a receiving device includes but is not limited to:

newness (i.e., generation) of the communication;
MIME type of the communication;
recency of use of the communication;
relevance to the role or roles of the device user (e.g., team leader, content expert);
user profile, defined either explicitly or implicitly by behavior;
label (e.g., group, topic, who sends it);
size of the communication;
metadata tagging (and any nested layers of metadata tags) of the communication;
Relevance to users of other devices 12 includes but is not limited to:
recency of requests for specific item;
mime type of the communications;
inferred priority of mime type from share-pair;
QOS demand markers associated with share pairs (e.g., team project is very important, or a transient message is not very important). Some share-pairs carry very important content and others do not. QOS demand markers can be reassigned dynamically;
how many other share-pairs there are in this set of matched share-pairs; and
its examinable contract.

This composite cache management is optimized for a distributed network, such as the MANET 6, in which there is no centralized storage device. Although there is no centralized data storage device, and each computing device 12 may have limited memory, other computing devices 12 in the MANET 6 may have priorities that ensure that documents that are important to someone in the share-pair are not deleted from the share-pair, but instead are only stored by the individual to whom they are most important.

In one embodiment, there is a central storage device that can act as a cache of some or all communications in the network 2. This central storage device can store information about all communications that go over the MANET 6, providing not only an additional QOS capability, but also a real-time backup of the entire network 2.

Multicast Packet Hop (Hip Hop)

In classroom environments, the networking mechanism for communicating among computing devices 12 (referred to also as nodes 12) can be simplified. The use of multicast addresses—corresponding to the share-pair contracts—can accomplish the exchange of information among nodes 12 without using routing tables, without needing to determine actual routes from IP addresses, and without using an IP address to identify a person with a computing device. One such networking mechanism, referred to as multicast packet hop (or "Hip Hop"), enables multi-hop, multicast communications in the wireless network medium without such routing support. In brief overview, each computing device 12 that receives an incoming multicast packet decides whether to re-issue that packet to the wireless network medium. One reason for re-issuing the packet is if the computing device 12 can determine that another computing 12 within listening range is interested in the packet and has not yet heard the packet.

Figure 8:
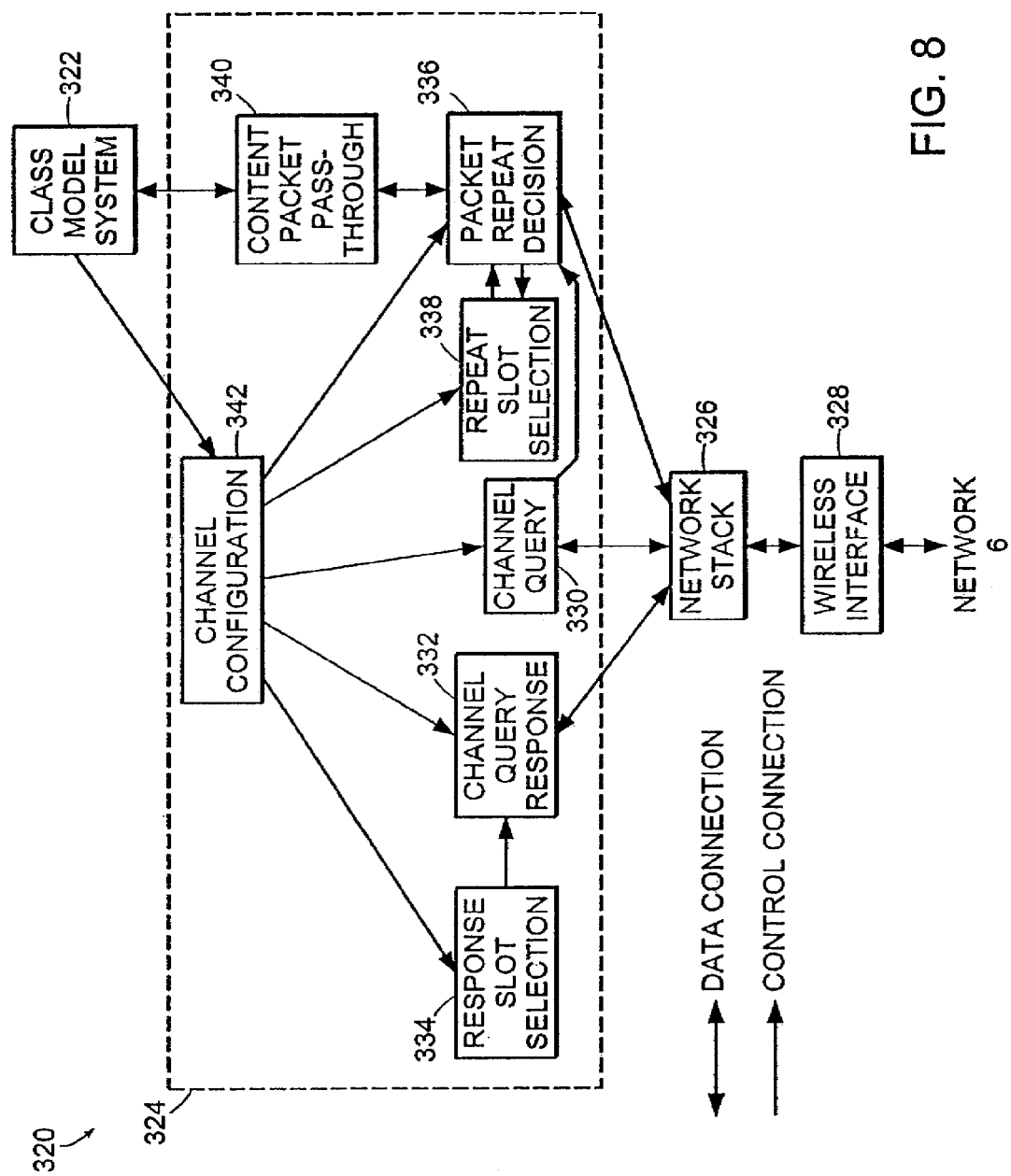
FIG. 8 is a block diagram of components for implementing a packet transmission protocol of the invention.

FIG. 8 shows a conceptual diagram of the multicast packet hop layer 50 used by each of the nodes 12 in the network 2 to propagate packets through the network 2. Although a variety of networking mechanisms can be used in service of transporting data, the multicast packet hop layer 50 of the invention is particularly suited to the needs and circumstances associated with a classroom environment. Those needs and circumstances include:

the participating nodes 12 are typically in close proximity to one another (i.e., under 2 meters to the nearest neighboring node 12), the classroom environment is relatively isotropic; that is, the environment is approximately the same in every direction in that the number and distribution of neighboring participants is approximately the same for each participant, the number of participants (teacher and students) is typically small and fixed, geographically proximal nodes 12 are likely to be participants working on closely related tasks with significant amounts of common data, participating nodes 12 typically have very low processing capabilities, participating nodes 12 have stringent power requirements, uniform usage of power across the participating nodes 12 is as important as total power consumption, the number of participating nodes 12, although variable, has a quite limited range—from a few to a few tens of nodes 12, to, possibly, several hundred, but typically not more, and support for node to node 12 communication independent of the data delivery as described herein is of low priority.

The multicast packet hop layer 50 includes channel management software 324, which provides a short-range (approximately twice the typical inter-node 12 distance) wireless networking system (e.g. low transmit power 802.11) capable of carrying IP multicast packets. Components of the channel management software 324, in one embodiment, include a channel query component 330, a channel query response component 332, a response slot selection component 334, a packet repeat decision component 336, a repeat slot selection component 338, a content packet pass through component 340, and a channel configuration component 342.

The channel management software 324 is in communication with a CML system 322, which in one embodiment includes one or more applications written in the ClassSync Modeling Language described above, and with a network stack 326. Data flows to and from the wireless network 6 through the wireless interface 328 and the network stack 326. The network stack 326 is capable of sending and receiving arbitrary IP multicast packets to and from the wireless interface 328. The network stack 326 also exchanges data with the channel query response component 332, channel query component 330, and the packet repeat decision component 336.

The packet repeat decision component 336 receives control instructions from the channel configuration component 342, channel query component 330, and the repeat slot selection component 338, sends control instructions to the repeat slot selection component 338, and exchanges data communications with the content packet pass through component 340. The content packet pass through component 340 is in communication with the ClassSync System 322 and operates as a filter of packets passing to and from. Although shown to be part of the multicast packet hop layer 320, the content packet pass through component 340 can be a software component that operates at another layer of the protocol stack 30. For example, in one embodiment, the content packet pass through component 340 operates as the contract layer 38 described in connection with FIG. 1B.

In one embodiment, a multicast address is associated with a particular data context (e.g., homework). Using data supplied over a different mechanism (e.g., point-to-point beaming, verbal instructions), the channel configuration component 342 configures those nodes 12 that are involved in that particular data context to respond to the multicast address associated with that data context. (In contrast with standard IP multicast, every node 12 in the network 2 can source data to a multicast address, and receive data packets addressed to that multicast address.)

For an activity having one data context only, only one multicast IP address is used in all transmissions and receptions of data. Thus, for each node 12 in the network 2, the routing of packets through the network 2 reduces to determining, upon receipt of a packet, whether to repeat that packet.

To make this determination, each node 12 measures the local connectivity of the network 2, at configurable intervals, using the channel query component 330. In one embodiment, the channel query component 330 invokes the standard IP multicast 'interest' query and records the total number of responses that the node 12 receives. This number, hereafter referred to as the local connectivity number, is used by the packet repeat decision component 336, along with other information, to determine whether a received packet is to be repeated.

Other nodes 12, upon receiving the query, use the channel query response component 332 and the response slot selection component 334 to appropriately respond to the query. In particular, the channel query response component 332 transmits a response during a time slot determined by the response slot selection component 334 if the node 12 has not received a response from another node 12 before the node's 12 time slot occurs. In one embodiment, the channel query response component 332 invokes the standard IP multicast 'interest' channel query response and response slot selection mechanisms.

In one embodiment, the response slot selection component 334 chooses the time slot randomly upon each occurrence of a request for a time slot from the channel query response component 332. Thus, the amount of time that a particular node 12 waits before responding to a channel query varies from channel query to channel query. This variable delay distributes the power consumed by each of the nodes 12 to respond to channel queries—the random delay at each node 12 causes the nodes 12 to take turns transmitting a reply. This distribution of power consumption is particularly advantageous in a classroom where the computing devices 12 are battery-powered and, with all other factors being equal, reduces that likelihood that some computing devices 12 will run out power before others in the network 2.

In another embodiment, suitable for classrooms with few students (e.g., 2-30), the response slot is externally assigned—one per node 12 in the classroom, to avoid potential collisions between responding nodes 12. In this embodiment, the external assignment of response slots performs the function of the response slot selection component 334. The externally assigned slots can be periodically rotated among the nodes 12 so that no one node 12 bears more of the response burden than any other node 12.

In another embodiment, suitable for use when the wireless link hardware is so configurable, the response slot selection component 334 includes the contention slot selection mechanism that is part of the wireless Media Access Control (MAC) protocol.

Figure 9:
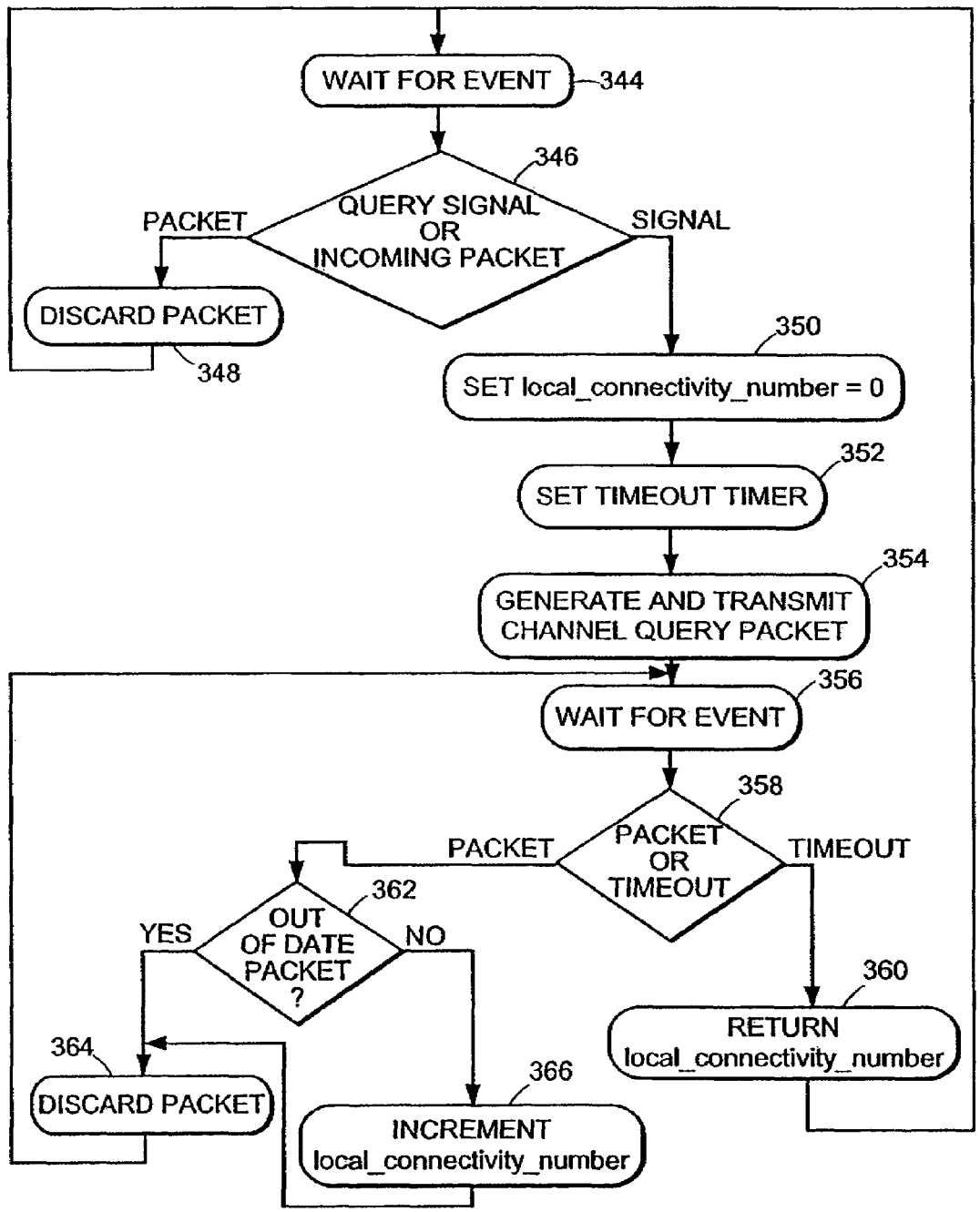
FIG. 9 shows an embodiment of a process by which a computing device (i.e., node) determines a local connectivity number.

FIG. 9 shows an embodiment of a process by which a node 12 determines the local connectivity number. In step 344, the channel query component 330 waits for an event to occur. For example, an event can be the arrival of a query response packet (which can be left over from previous query) or a signal from the channel configuration component 342 indicating that a recomputation of the local connectivity number is desired (e.g., on the basis of the expiration of a timer). Upon the occurrence of an event, the channel query component 330 determines whether (step 346) the event is an incoming query response packet or a signal to begin a new query. If the event is a packet, the node 12 discards (step 348) the packet. If the event is a query signal, the channel query component 330 sets (step 350) the local connectivity number equal to 0.

In step 352, the node 12 starts a local timeout timer. In step 354, the channel query component 330 generates and transmits a channel query packet. The node 12 then counts the number of responses to the channel query packet that occur before the timer times out. Accordingly, the channel query component 330 waits (step 356) for the occurrence of an event. Upon the occurrence of an event, the channel query component 330 determines (step 358) if the event is the timeout of the timer or the receipt of a packet.

In step 360, if the event is the timeout of the timer, the channel query component 330 returns the present value of the local connectivity number. In step 362, if the event is a packet, the channel query component 330 determines if the packet is out of date. The channel query component 330 discards (step 364) the packet if the packet is outdated, otherwise, increments (step 366) the local connectivity number. The channel query component 330 then waits (step 344) for the occurrence of the next event.

Figure 10A:
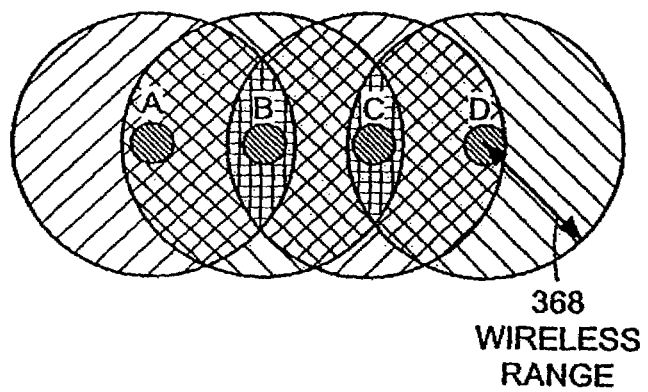
FIGS. 10A-10E are conceptual diagrams illustrating examples of network configurations and examples for determining a local connectivity number in the network configurations.

FIGS. 10A-10E illustrate various examples of computing the local connectivity number in several network 2 situations. FIG. 10A shows a diagram illustrating an embodiment in which four nodes 12 (A, B, C, and D) are within proximity of each other. Each node 12 has a wireless range 368 within which that node 12 can "hear" other nodes 12 (i.e., for transmitting and receiving packets). As shown by the overlapping wireless ranges, node 12 A can hear node 12 B, node 12 B can hear nodes 12 A and 12 C, node 12 C can hear nodes 12 B and 12 D, and node 12 D can hear node 12 C.

Figure 10B:
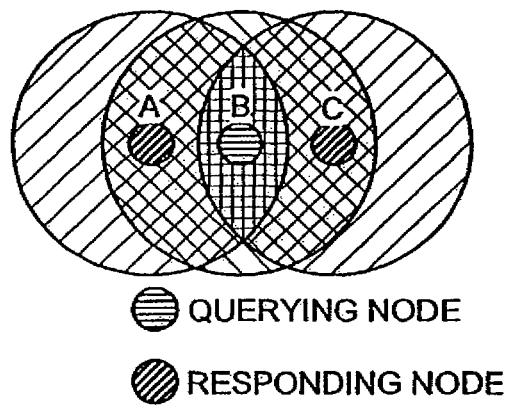

FIG. 10B shows an example of computing the local connectivity number from the point of view of node 12 B. In this example, node 12 B is the querying node 12 and both nodes 12 A and 12 C respond to the query of node 12 B because both nodes 12 A and 12 C receive the query and neither node 12 A nor node 12 C can hear the other. Thus, the local connectivity number is 2.

Figure 10C:
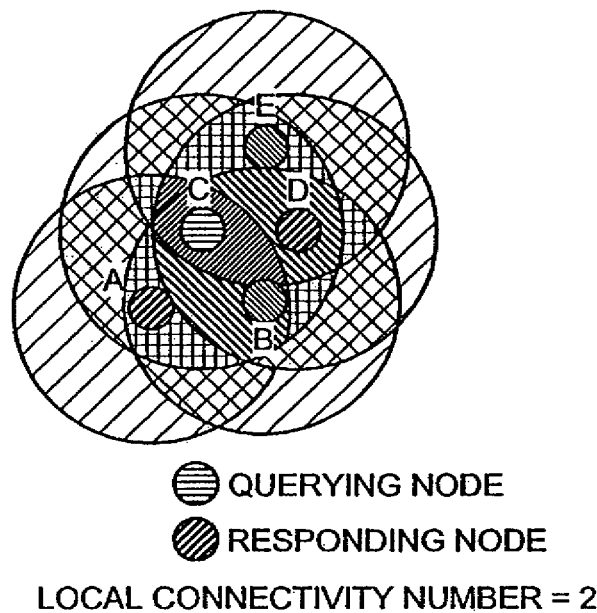

FIG. 10C shows an example of computing the local connectivity number in a network 2 with five nodes 12 A, 12 B, 12 C, 12 D, and 12 E. In this example, node 12 C is the querying node 12. Because the wireless ranges of nodes 12 A, 12 B, 12 D, and 12 E overlap the wireless range of node 12 C, each node 12 receives the query. In the network 2, node 12 B can also hear nodes 12 A and 12 D, but not node 12 E. Node 12 E can also hear node 12 D, but not nodes 12 A and 12 B. Accordingly, when node 12 A responds to the query (in this example, because the node 12 A's timer times out before node 12 B's timer) node 12 B does not reply to the query because node 12 B receives node 12 A's response before node 12 B's timer times out. Similarly, node 12 E does not reply to node 12 C's query, because node 12 E hears node 12 D's reply before node 12 E's timer times out (in this example, node 12 D's timer times out before node 12 Es timer). Consequently, node 12 C hears two replies, and therefore the local connectivity number from the perspective of node 12 C is 2.

Figure 10D:
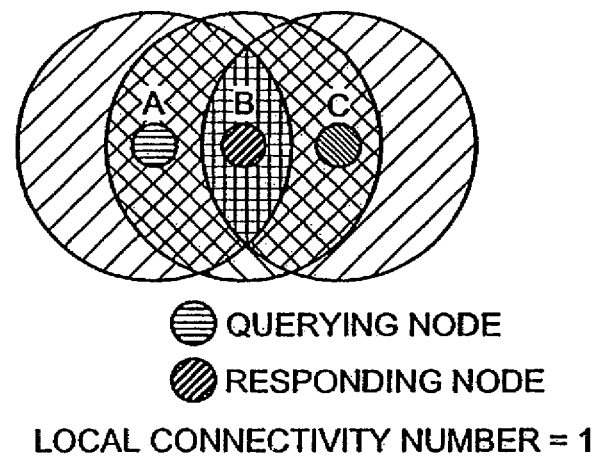

FIG. 10D shows an example of computing the local connectivity number from the point of view of node 12 A. In this example, node 12 A is the querying node 12 and node 12 B responds to the query. Node 12 C does not respond to the query because node 12 C does not hear the query. Node 12 C receives node 12 B's reply, but discards the reply because the reply, from the perspective of node 12 C, is not associated with any known query. Even if node 12 C hears the query from node 12 A, if node 12 B responds first, node 12 C does not respond. Thus, the local connectivity number is 1.

Figure 10E:
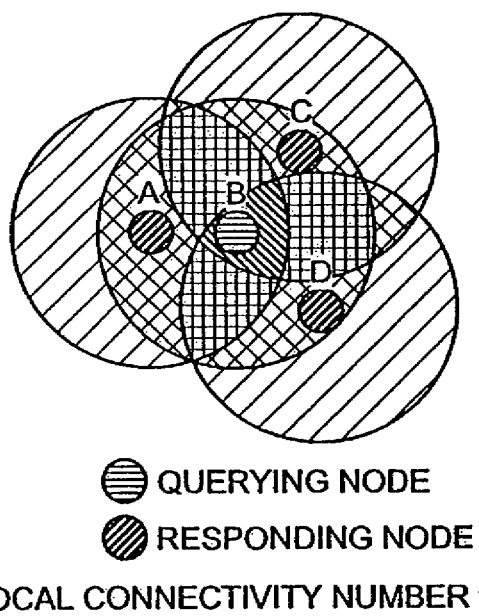

FIG. 10E shows another example of computing the local connectivity number in a network 2 with four nodes 12 A, 12 B, 12 C, and 12 D. In this example, node 12 B is the querying node 12. The wireless ranges of nodes 12 A, 12 C, and 12 D overlap the wireless range of node 12 B, thus each of these nodes 12 A, D and 12 D receives the query. In this example, node 12 A cannot hear nodes 12 C and 12 D, node 12 C cannot hear nodes 12 A and 12 D, and node 12 D cannot hear nodes 12 A and 12 C. Accordingly, each of the nodes 12 A, 12 C, and 12 D respond to node 12 B, and therefore the local connectivity number from the perspective of node 12 B is 3.

Figure 11:
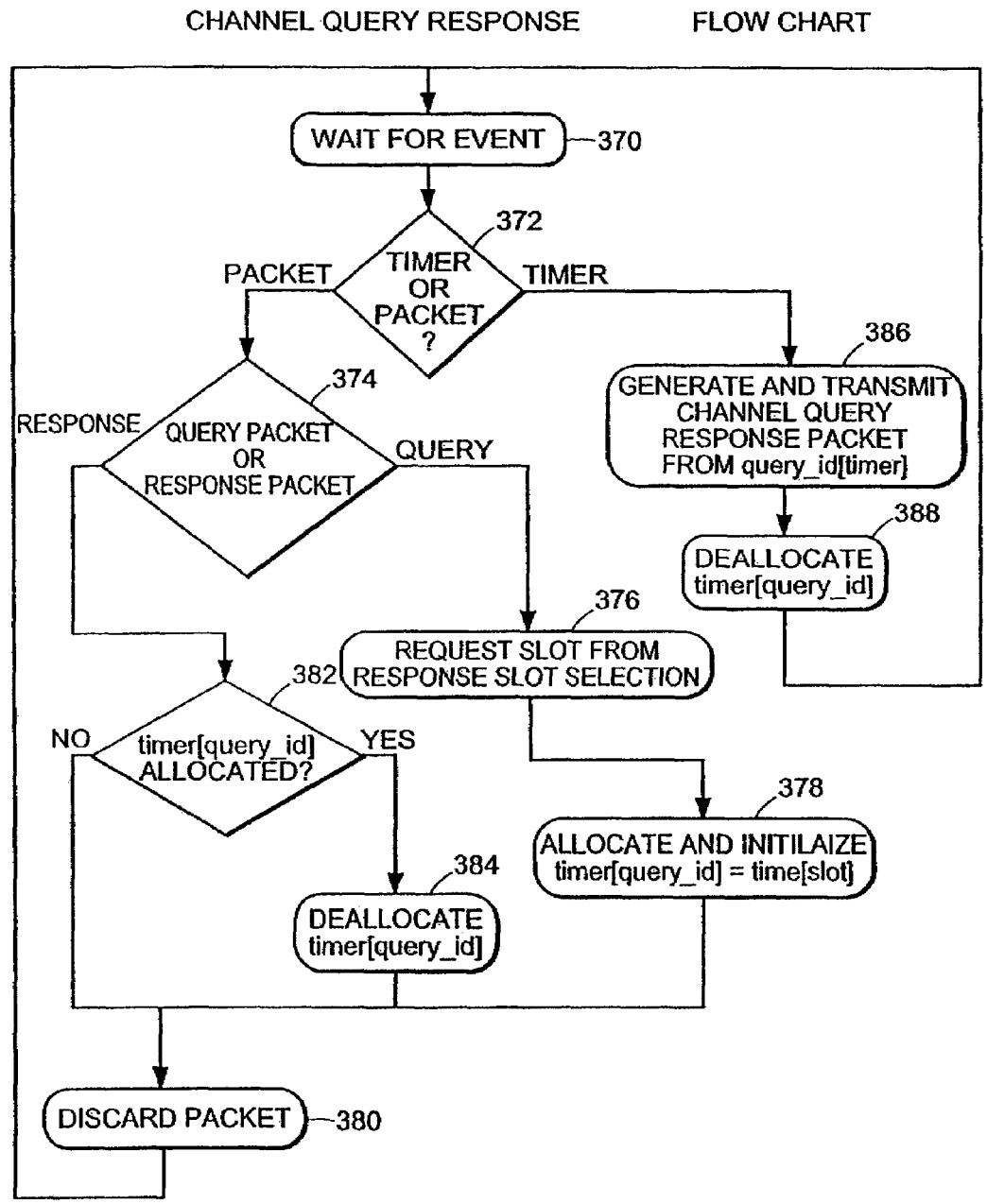
FIG. 11 is a flow diagram of an embodiment of a process by which a node determines whether to reply to a query.

FIG. 11 shows an embodiment of a process by which a node 12 determines whether to reply to a query. In step 370, the channel query response component 332 waits for an event. Upon the occurrence of an event, the channel query response component 332 determines (step 372) if the event is the timeout of the timer or the receipt of a packet.

If the event is a packet, the channel query response component 332 determines (step 374) if the packet is a query packet or a response packet.

If the event is a query packet, the channel query response component 332 requests (step 376) a response slot from the response slot selection component 334.

In step 378, the channel query response component 332 then allocates a time slot and initializes the timer (e.g., timer [query_id]=time[slot], where query_id is a value assigned to identify the query packet, timer[query_id] is the timer associated with the query packet, and time[slot] is the time when the node 12 is to respond to the query packet if the node 12 does not hear another response). The channel query response component 332 then discards (step 380) the query packet.

If the event is a response packet, the channel query response component 332 determines (step 382) if a time slot (timer[query_id]) has been allocated. If so, the node 12 has heard a response to a query that the node 12 also heard, but no longer needs to respond to because another node 12 responded first. Accordingly, the channel query response component 332 deallocates (step 384) the time slot and discards (step 380) the response packet. If a time slot has not been allocated, the node 12 has heard a response to a query that the node 12 itself has not heard. Accordingly, the channel query response component 332 discards (step 380) the response packet.

If, in step 372, the event is the timeout of the timer, the node 12 has not heard a response to the query from another node 12. Thus, the channel query response component 332 generates and transmits (step 386) a channel query response packet from query_id[timer], deallocates (step 388) the timer[query_id], and then waits (step 370) for the occurrence of the next event.

Figure 12A:
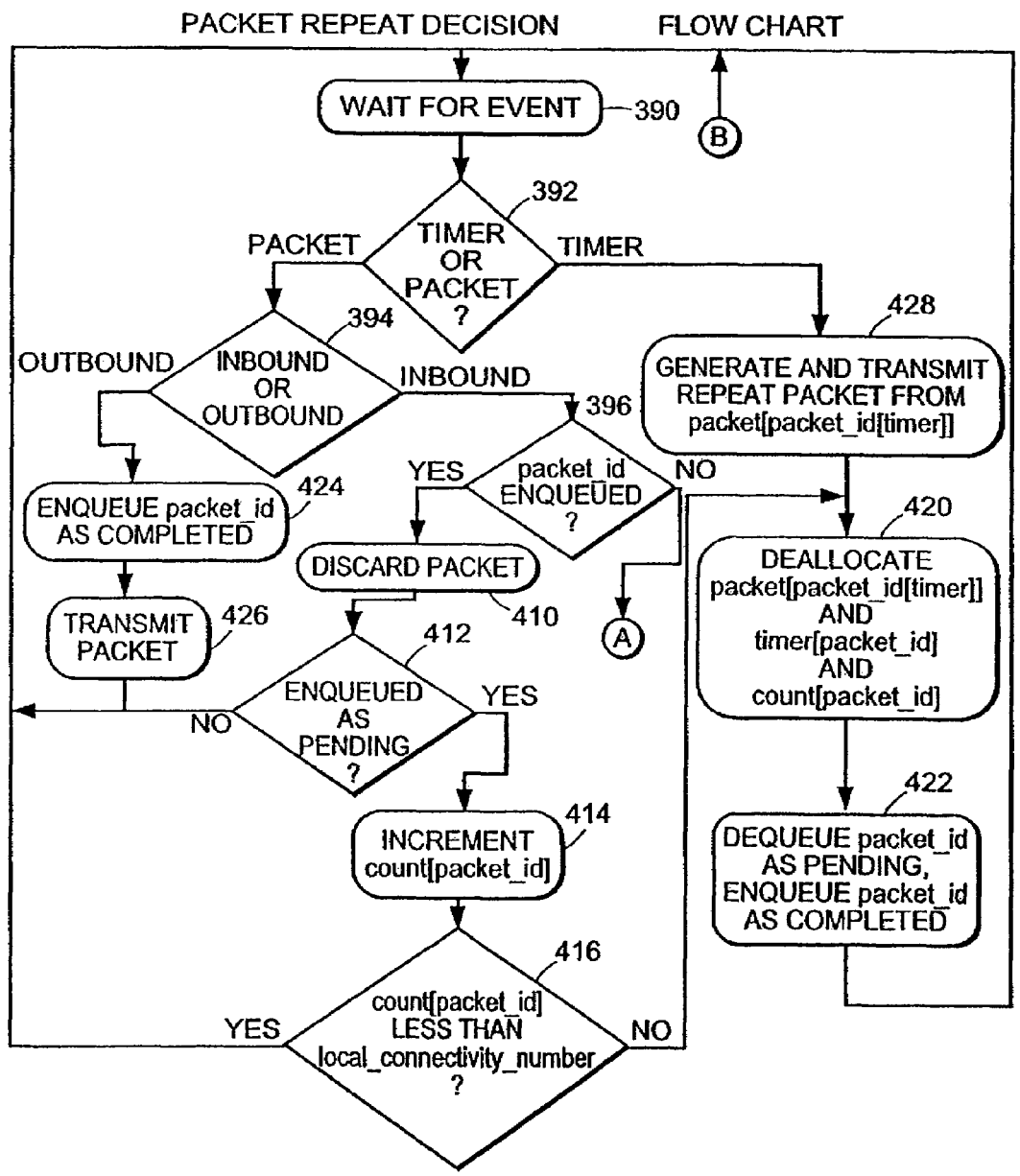
FIGS. 12A-12B are flow diagrams of an embodiment of a process by which a node determines whether to repeat a received packet.
Figure 12B:
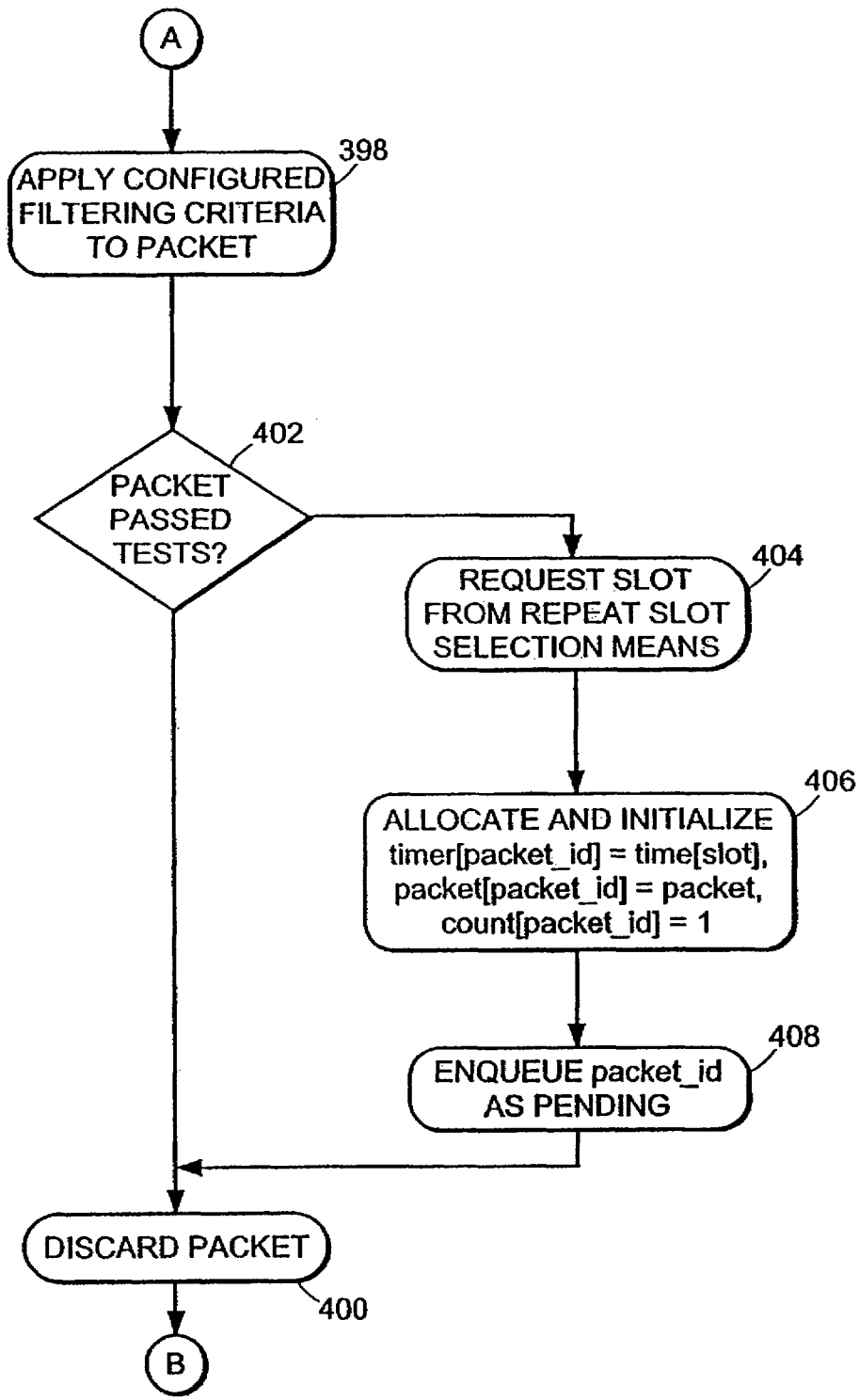

FIGS. 12A-12B show an embodiment of a process by which a node 12 determines whether to repeat a received packet. In step 390, the packet repeat decision component 336 waits for an event. Upon the occurrence of an event, the packet repeat decision component 336 determines (step 392) if the event is the timeout of the timer or the receipt of a packet.

If the event is a packet, the packet repeat decision component 336 determines (step 394) if the packet is an inbound packet (received from the network 2) or an outbound packet (to be transmitted to the network 2).

In general, if the packet is an inbound packet, and not a channel query or a channel query response, the packet repeat decision component 336 determines whether that packet is to be repeated, that is retransmitted (or rebroadcast) over the network 2. In step 396, the packet repeat decision component 336 determines if the inbound packet (packet_id) is enqueued, indicating that the packet has been previously received and deemed suitable for retransmission. If the inbound packet is not enqueued, the packet repeat decision component 336 applies (step 398) configured filtering criteria to the packet. If the packet does not pass the criteria, the packet repeat decision component 336 discards (step 400) the packet. The criteria are based on a context specification currently bound to the multicast address and on the specific metadata associated with the inbound packet.

For example, situations can arise where a computing device 12 encounters "stray" packets, (e.g., from a neighboring classroom, and it is undesirable to have these stray packets pass through the present classroom into other classrooms. One technique for handling undesired packet traffic is to insure that neighboring classrooms use disjoint sets of multicast IP addresses. For this technique, the criteria used in each of the classrooms are to filtered out packets that have disallowed IP addresses. The technique requires coordination among the classrooms (i.e., the teacher or administrator) to assign the multicast IP addresses to their respective classrooms. Another technique is to include information in the packets that is unlikely to be common between neighboring classrooms. For example, such information can include the name of the teacher and the nature of the class ("Mrs. Brown's Fourth Period Algebra Class"). Accordingly, the packet repeat decision component 336 can be configured to "intelligently" filter undesired packets.

The application of such criteria is in addition to applying typical IP routing criteria such as the expiration of the time-to-live counter, malformed IP address, corrupt payload, etc. If the inbound packet fails (step 402) any of the additional configured criteria, the packet repeat decision component 336 marks the packet as non-repeating and discards (step 400) the packet and any additional received copies.

If the packet passes the criteria (and other IP routing requirements), the packet repeat decision component 336 requests (step 404) a time slot from the repeat slot selection component 338 in which to retransmit the packet.

In one embodiment, the repeat slot selection component 338, the response slot selection component 334 chooses the time slot randomly upon each occurrence of a request for a time slot from the packet repeat decision component 336. Thus, the amount of time that a particular node 12 waits before re-transmitting the multicast packet varies for each multicast packet received. Again, this variable delay distributes the power consumed among the nodes 12 in the network.

In another embodiment, suitable for classes with small numbers of nodes 12, the slot is externally assigned—one per node 12 in the class, thus avoiding potential collisions. Slot assignments can be periodically rotated among the nodes 12 so that no node 12 bears more of the response burden, and consumes more battery power, than any other node 12.

Then in step 406 the packet repeat decision component 336 allocates and initializes the timer[packet_id]=time[slot], the packet[packet_id]=the packet, and the count[packet_id]=1. The packet repeat decision component 336 enqueues (step 408) packet_id as pending, discards (step 400) the packet, and returns to waiting (step 390) for the next occurrence of an event.

In brief overview, until the timer times out the packet repeat decision component 336 counts the number of copies of the inbound packet (including the original) received by the node 12. If the node 12 has received strictly fewer than the local connectivity number of copies when the timer times out, the packet repeat decision component 336 causes the packet to be transmitted (after first decrementing the counter and performing other normal packet retransmission operations).)

More specifically, if in step 396 the inbound packet is enqueued (indicating that the packet is waiting to be retransmitted (i.e., pending) or has recently been retransmitted or otherwise handled (i.e., completed)), the packet repeat decision component 336 discards (step 410) the inbound packet because there already is an enqueued copy. In step 412, the packet repeat decision component 336 determines if the enqueued packet is pending. If not pending, the packet repeat decision component 336 returns to waiting (step 390) for an event.

If the inbound packet is enqueued as pending, the packet repeat decision component 336 increments (step 414) the count for the inbound packet (e.g., packet_id (count[packet_id])). In step 416, the packet repeat decision component 336 compares the current count with the local connectivity number. If the count is less than the local connectivity number, the packet repeat decision component 336 returns to waiting (step 390) for an event. If the count equals the local connectivity number, the packet repeat decision component 336 deallocates (step 420) packet[packet_id[timer]], the timer[packet_id], and count[packet_id]. In step 422, the packet repeat decision component 336 dequeues the packet_id as pending and enqueues packet_id as completed. Then the packet repeat decision component 336 returns to waiting (step 390) for the occurrence of an event.

If in step 392 the event is the timeout of the timer, the packet repeat decision component 336 generates and transmits (step 428) a repeat packet from packet[packet_id[timer]], deallocates, dequeues, enqueues as set forth in steps 420 and 422, and returns to waiting (step 390) for the occurrence of an event.

If in step 394 the packet is an outbound packet, the packet repeat decision component 336 enqueues (step 424) packet_id as completed and transmits (step 426) the packet. Then the packet repeat decision component 336 returns to waiting (step 390) for the occurrence of an event.

The networking mechanism described in FIGS. 8-12B includes two properties that help battery life. A first property, packets take short hops, and short distances between hops require less transmission power than longer distances. A second property, power consumption is distributed among the nodes 12 by causing the nodes 12, in effect, to take turns when responding to channel queries and when re-transmitting multicast packets.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for operating an electronic device in a wireless network, the method comprising:
providing a first plurality of transceivers by which the electronic device sends and receives data over the wireless network, wherein each of the first plurality of transceivers is configured to perform a different transaction from among a first plurality of transactions;

associating a rules identifier to the electronic device;

positioning the electronic device within a communication range of at least one of a second plurality of transceivers that is independent of the first plurality of transceivers, wherein each of the second plurality of transceivers is configured to perform at least one transaction from among the first plurality of transactions;

associating the rules identifier to the at least one of the second plurality of transceivers; and exchanging data between the electronic device and the at least one of the second plurality of transceivers according to the at least one transaction, the exchanged data including the rules identifier, wherein the exchanging comprises:

receiving, by the electronic device, a set of rules, wherein at least a portion of the set of rules includes a subset of rules specified by the rules identifier, wherein the subset of rules includes an exchange rule that controls the exchanging for the at least one transaction;

storing the set of rules on the electronic device;

enforcing the exchange rule by the electronic device; and enforcing the exchange rule by the at least one of the second plurality of transceivers.

2. The method of claim 1, wherein each of the first plurality of transceivers communicates independently of a remainder of the plurality of transceivers.

3. The method of claim 1, wherein the second plurality of transceivers is associated with at least one device that is separate from the electronic device.

4. The method of claim 3, wherein the electronic device and the at least one device are both wireless electronic devices.

5. The method of claim 3, wherein the electronic device is a wireless electronic device, and the at least one device is an electronic resource.

6. The method of claim 3, wherein the electronic resource is a printer, a projection display, a robot, a scanner, a fax machine, or a data collection device.

7. The method of claim 3, wherein the electronic resource is a wired electronic resource connected to a wireless access point.

8. The method of claim 1, wherein the wireless network is an ad hoc wireless network.

9. The method of claim 1, wherein the first plurality of transceivers and the second plurality of transceivers each comprises at least one point to point transceiver.

10. The method of claim 1, wherein the first plurality of transceivers and the second plurality of transceivers each comprises at least shared medium transceiver.

11. The method of claim 1, wherein the second plurality of transceivers is geographically distributed over different locations within a defined area.

12. The method of claim 11, wherein the defined area comprises a classroom.

13. The method of claim 12, wherein the electronic device is operated by a student in the classroom.

14. The method of claim 13, wherein at least one of the second plurality of transceivers is associated with an electronic device operated by a teacher in the classroom.

15. The method of claim 13, wherein the data relates to an assignment assigned to the student.

16. The method of claim 1, wherein the exchange rule automatically enables the electronic device and the at least one of the second plurality of transceivers to perform the exchanging.

17. The method of claim 16, wherein the enforcing comprises:

receiving a message for transmission over the wireless network according to the at least one transaction, where the message includes the data;

automatically confirming that the exchange rule allows transmission of the message over the wireless network; and transmitting the message over the wireless network only when it is confirmed that the exchange rule allows transmission of the message over the wireless network.

18. The method of claim 17, further comprising:

associating the exchange rule with the message prior to transmitting the message over the wireless network.

19. The method of claim 16, wherein the enforcing comprises:

receiving a message for acceptance according to the at least one transaction, where the message includes the data;

automatically confirming that the exchange rule allows acceptance of the message; and accepting the message only when it is confirmed that the exchange rule allows acceptance of the message.

20. The method of claim 19, wherein the automatically confirming comprises:

detecting that the exchange rule is associated with the message.

21. The method of claim 19, further comprising:

determining a content of the data; and routing the data to a program on the electronic device that is configured to handle the data.

22. The method of claim 1, wherein the exchange rule restricts a type of the data.

23. The method of claim 1, wherein the exchange rule restricts a size of the data.

24. The method of claim 1, wherein the exchange rule restricts a time during which the exchanging is permitted to occur.

25. The method of claim 1, wherein the exchange rule restricts with which of the plurality of second transceivers the electronic device is permitted to perform the exchanging.

26. The method of claim 1, wherein the exchange rule restricts a launch of one or more applications on the electronic device.

27. The method of claim 1, wherein the exchange rule restricts a hosting of one or more applications on the electronic device.

* * * * *